United States Patent
Park et al.

(10) Patent No.: US 12,510,997 B2
(45) Date of Patent: Dec. 30, 2025

(54) ELECTRONIC DEVICE WITH TOUCH INPUT SENSITIVITY AND OPERATING METHOD THEREOF

(71) Applicant: SAMSUNG ELECTRONICS CO., LTD., Suwon-si (KR)

(72) Inventors: Sangho Park, Suwon-si (KR); Jiyoung Lee, Suwon-si (KR); Myunghoon Lee, Suwon-si (KR); Buyeong Kwak, Suwon-si (KR); Sooam Kim, Suwon-si (KR); Boeun Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/028,359

(22) Filed: Jan. 17, 2025

(65) Prior Publication Data

US 2025/0165103 A1    May 22, 2025

Related U.S. Application Data

(63) Continuation of application No. PCT/KR2023/011609, filed on Aug. 7, 2023.

(30) Foreign Application Priority Data

Sep. 19, 2022 (KR) .................. 10-2022-0118163
Jan. 31, 2023 (KR) .................. 10-2023-0013189

(51) Int. Cl.
   *G06F 3/041* (2006.01)
   *G06F 3/044* (2006.01)
(52) U.S. Cl.
   CPC .......... *G06F 3/04186* (2019.05); *G06F 3/044* (2013.01)

(58) Field of Classification Search
   CPC .................. G06F 3/04186; G06F 3/044
   See application file for complete search history.

(56) References Cited

U.S. PATENT DOCUMENTS 8,547,113 B2 * 10/2013 Yoshikawa ......... G06F 3/04182
                                                    324/683
9,274,663 B2    3/2016 Park et al.
(Continued)

FOREIGN PATENT DOCUMENTS

| CN | 109039319 A | 12/2018 |
| JP | 2013-115682 A | 6/2013 |

(Continued)

OTHER PUBLICATIONS

International Search Report issued on Nov. 2, 2023 by International Search Authority in International Application No. PCT/KR2023/011609.

(Continued)

*Primary Examiner* — Michael Pervan
(74) *Attorney, Agent, or Firm* — Sughrue Mion, PLLC

(57) ABSTRACT

An electronic device includes one or more processors, a memory storing instructions, and a user interface including at least one touch button, a capacitor coupled with the at least one touch button, and a switch configured to charge the capacitor and to discharge the capacitor. The instructions, when executed by the one or more processors individually or collectively, cause the electronic device to spread an operating frequency into a plurality of spread frequencies within a frequency range, determine, based on the plurality of spread frequencies, whether to at least one of charge the capacitor or discharge the capacitor by controlling the switch to at least one of turn on or turn off, measure a charging time of the capacitor, according to the controlling of the switch, and determine whether a touch input on the at (Continued)

least one touch button occurs, based on the measured charging time.

15 Claims, 9 Drawing Sheets

(56) References Cited

U.S. PATENT DOCUMENTS

| | | | |
|---|---|---|---|
| 9,426,882 | B2 | 8/2016 | Kim et al. |
| 9,448,679 | B2 | 9/2016 | Lee |
| 9,710,112 | B2 | 7/2017 | Han |
| 9,927,928 | B2 | 3/2018 | Kim |
| 10,345,948 | B2 * | 7/2019 | Kim ............... H03K 17/9622 |
| 10,871,852 | B2 | 12/2020 | Kim et al. |
| 12,019,831 | B2 * | 6/2024 | Chang ............... G06F 3/044 |
| 2004/0095335 | A1 | 5/2004 | Oh et al. |
| 2006/0279970 | A1 | 12/2006 | Kernahan |
| 2012/0019265 | A1 * | 1/2012 | Yoshikawa ......... G06F 3/044 |
| | | | 324/677 |
| 2013/0222341 | A1 | 8/2013 | Long et al. |
| 2014/0022203 | A1 | 1/2014 | Karpin et al. |
| 2014/0320449 | A1 * | 10/2014 | Park ............... G06F 3/0418 |
| | | | 345/174 |
| 2015/0253895 | A1 | 9/2015 | Kim |
| 2015/0340013 | A1 | 11/2015 | Lee et al. |
| 2017/0003809 | A1 * | 1/2017 | Kim ............... H03K 17/9622 |
| 2018/0074613 | A1 | 3/2018 | Lee |
| 2022/0021388 | A1 | 1/2022 | Wu |
| 2024/0143116 | A1 * | 5/2024 | Chang ............... G06F 3/0416 |

FOREIGN PATENT DOCUMENTS

| | | |
|---|---|---|
| KR | 10-0469355 B1 | 2/2005 |
| KR | 10-1024186 B1 | 3/2011 |
| KR | 10-1031996 B1 | 5/2011 |
| KR | 10-1106655 B1 | 1/2012 |
| KR | 10-1108703 B1 | 1/2012 |
| KR | 10-1135358 B1 | 4/2012 |
| KR | 10-2012-0054451 A | 5/2012 |
| KR | 10-1163602 B1 | 7/2012 |
| KR | 10-2013-0044267 A | 5/2013 |
| KR | 10-1282915 B1 | 7/2013 |
| KR | 10-1340026 B1 | 12/2013 |
| KR | 10-2014-0140269 A | 12/2014 |
| KR | 10-1497405 B1 | 3/2015 |
| KR | 10-1527440 B1 | 6/2015 |
| KR | 10-1566939 B1 | 11/2015 |
| KR | 10-2015-0134484 A | 12/2015 |
| KR | 10-1602842 B1 | 3/2016 |
| KR | 10-1606404 B1 | 3/2016 |
| KR | 10-1756668 B1 | 7/2017 |
| KR | 10-1763939 B1 | 8/2017 |
| KR | 10-1773612 B1 | 8/2017 |
| KR | 10-1771078 B1 | 9/2017 |
| KR | 10-1871667 B1 | 6/2018 |
| KR | 10-2019-0028257 A | 3/2019 |
| KR | 10-2298488 B1 | 9/2021 |
| KR | 10-2022-0082665 A | 6/2022 |

OTHER PUBLICATIONS

Communication issued Sep. 19, 2025 by the European patent Office in European Patent Application No. 23868389.0.

* cited by examiner

ELECTRONIC DEVICE WITH TOUCH INPUT SENSITIVITY AND OPERATING METHOD THEREOF

CROSS-REFERENCE TO RELATED APPLICATIONS

This application is a bypass continuation of International Application No. PCT/KR2023/011609, filed on Aug. 7, 2023, which claims benefit of priority to Korean Patent Application No. 10-2022-0118163, filed on Sep. 19, 2022, and Korean Patent Application No. 10-2023-0013189, filed on Jan. 31, 2023, in the Korean Intellectual Property Office, the disclosures of which are incorporated by reference herein in their entireties.

BACKGROUND

1. Field

The present disclosure relates generally to electronic device, and more particularly, to an electronic device with touch input sensitivity and a method of operating the same.

2. Description of Related Art

User interfaces (UIs) that may be included in various electronic devices may provide for interactions between users and the electronic devices. For example, UIs may be included in electronic devices such as, but not limited to, home appliances (e.g., ovens, induction ovens, microwave ovens, refrigerators, washing machines, air conditioners, dishwashers, or garment care devices), vehicles, mobile devices (e.g., smartphones, cellular phones, tablet computers, digital cameras, personal digital assistants (PDA), or wearable devices), or the like. An example of a user interface may include a touch-based UI. The touch-based UI may be configured to receive an input of the user through a touch button (and/or touch sensor).

The touch-based UI may receive the input of the user by determining whether a touch input has occurred based on a change in a capacitance of a capacitor connected to the touch button. For example, when no touch input occurs (and/or no touch input is detected), the capacitance of the capacitor connected to the touch button may be C1 (hereinafter may be referred to as an intrinsic capacitance and/or an intrinsic parasitic capacitance). When a touch input occurs (and/or a touch input is detected), the capacitance of the capacitor connected to the touch button may be C1+Cf, where Cf may represent a capacitance of a finger or capacitance of a touch pen effecting the touch.

The touch-based UI may use a fixed operating frequency (and/or a clock frequency) to charge and/or discharge the capacitor connected to the touch button. Consequently, when incoming noise from outside (e.g., a power line) has a frequency (e.g., 6 megahertz (MHz) on 220 volts (V) power supply with direct current (DC)+3V) that may be substantially similar to and/or the same as the operating frequency, the noise may be introduced to the capacitance of the capacitor connected to the touch button within the corresponding frequency band (e.g., 6 MHz). When the noise is introduced to the capacitance of the capacitor connected to the touch button, the electronic device may wrongly determine a touch input to the touch button. For example, when the noise is introduced to the capacitance of the capacitor connected to the touch button, the electronic device may erroneously determine that a touch input occurs even though there is no occurrence of the touch input on the touch button.

SUMMARY

One or more example embodiments of the present disclosure provide an electronic device with improved touch input sensitivity, when compared to related electronic devices, and a method of operating the same.

According to an aspect of the present disclosure, an electronic device includes one or more processors including processing circuitry, a memory storing instructions, and a user interface including at least one touch button, a capacitor coupled with the at least one touch button, and a switch, coupled between the at least one touch button and the capacitor, configured to charge the capacitor, and to discharge the capacitor. The instructions, when executed by the one or more processors individually or collectively, cause the electronic device to spread an operating frequency into a plurality of spread frequencies within a frequency range, determine, based on the plurality of spread frequencies, whether to at least one of charge the capacitor or discharge the capacitor by controlling the switch to at least one of turn on or turn off, measure a charging time of the capacitor, according to the controlling of the switch, and determine whether a touch input on the at least one touch button occurs, based on the measured charging time.

According to an aspect of the present disclosure, a method of operating an electronic device includes spreading an operating frequency into a plurality of spread frequencies within a frequency range, determining, based on the plurality of spread frequencies, whether to at least one of charge a capacitor of the electronic device or discharge the capacitor by controlling a switch of the electronic device to at least one of turn on or turn off, measuring a charging time of the capacitor according to the controlling of the switch, and determining whether a touch input on a touch button of the electronic device has occurred, based on the measured charging time.

Additional aspects may be set forth in part in the description which follows and, in part, may be apparent from the description, and/or may be learned by practice of the presented embodiments.

BRIEF DESCRIPTION OF THE DRAWINGS

The above and other aspects, features, and advantages of certain embodiments of the present disclosure may be more apparent from the following description taken in conjunction with the accompanying drawings, in which.

DETAILED DESCRIPTION

Figure 1:
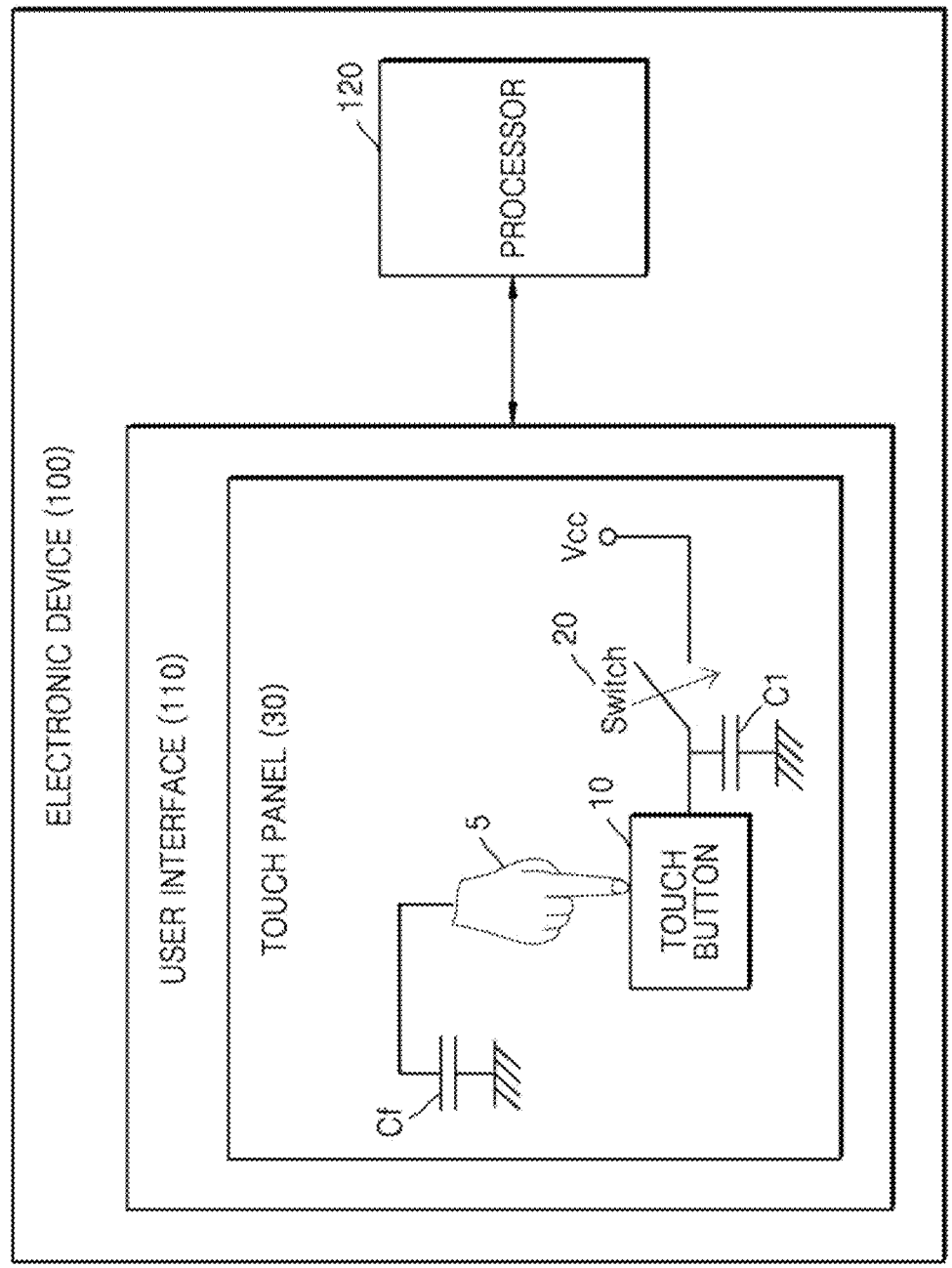
FIG. 1 is a diagram of an electronic device, according to an embodiment of the present disclosure.

Terms as used herein are described before detailed descriptions of embodiments of the present disclosure are provided.

The terms are selected as common terms that are currently widely used, taking into account principles of the present disclosure, which may however depend on intentions of those of ordinary skill in the art, judicial precedents, emergence of new technologies, and the like. Some terms as used herein are selected at the applicant's discretion, in which case, the terms may be described later with reference to embodiments of the present disclosure. Therefore, the terms may be defined based on their meanings and descriptions throughout the present disclosure.

Throughout the present disclosure, the expression "at least one of a, b or c" indicates only a, only b, only c, both a and b, both a and c, both b and c, all of a, b, and c, or variations thereof.

In the present disclosure, the expression "and/or" may be interpreted to include a combination or any of multiple elements. In the present disclosure, terms like "first", "second", or the like, may be simply used to distinguish an element from another, without limiting the elements in a certain sense (e.g., in terms of importance or order).

The term "include (or including)" or "comprise (or comprising)" may be inclusive and/or open-ended and may not exclude additional, unrecited elements or method steps.

The terms "unit", "module", or the like, as used herein may each represent a unit for handling at least one function or operation, and may be implemented in hardware such as, but not limited to, a field programming gate array (FPGA) or application specific integrated circuit (ASIC), software, or a combination thereof. The term "unit" as used herein may not exclusively refer to software or hardware. The unit may be configured to be in an addressable storage medium and to execute one or more processors. For example, the unit may include components, such as, but not limited to, software components, object-oriented software components, class components and task components, processes, functions, attributes, procedures, subroutines, segments of program codes, drivers, firmware, microcodes, circuits, data, databases, data structures, tables, arrays, variables, or the like. Functions provided through certain components or certain units may be combined to reduce the number or divided into additional components. In an embodiment, the unit may include one or more processors that may execute one or more instructions, individually or collectively, to perform one or more aspects of the present disclosure. In an embodiment, the one or more processors may include processing circuitry configured to perform one or more aspects of the present disclosure.

In an embodiment of the present disclosure, respective blocks and combinations of the blocks in flowcharts may be performed by computer program instructions. The computer program instructions may be loaded onto a processor of a universal computer, a special computer or other programmable data processing equipment. Instructions performed by the processor of a computer or other programmable data processing equipment may generate means for performing functions as described in the blocks of the flowchart. The computer program instructions may also be stored in a computer-usable or computer-readable memory that may be oriented to a computer or other programmable data processing equipment to implement a function in a certain manner. The instructions stored in the computer-usable or computer-readable memory may also produce a manufactured item that may include instruction means for performing the function as described in the blocks of the flowchart. The computer program instructions may also be loaded onto a computer or other programmable data processing equipment.

Furthermore, each block of the flowchart may represent a part of a module, segment, or codes including one or more executable instructions to perform particular logic functions. In an embodiment of the present disclosure, it is also possible that the functions recited in the blocks occur out of the sequence. For example, two successive blocks may be performed at substantially the same time or in reverse order depending on the corresponding functions. That is, it is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

The embodiments herein may be described and illustrated in terms of blocks, as shown in the drawings, which carry out a described function or functions. These blocks, which may be referred to herein as units or modules or the like, or by names such as device, logic, circuit, controller, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like.

In the present disclosure, the articles "a" and "an" are intended to include one or more items, and may be used interchangeably with "one or more." Where only one item is intended, the term "one" or similar language is used. For example, the term "a processor" may refer to either a single processor or multiple processors. When a processor is described as carrying out an operation and the processor is referred to perform an additional operation, the multiple operations may be executed by either a single processor or any one or a combination of multiple processors.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment. The embodiments described herein are example embodiments, and thus, the disclosure is not limited thereto and may be realized in various other forms.

Embodiments of the present disclosure are described with reference to accompanying drawings so as to be readily practiced by those of ordinary skill in the art. However, an embodiment of the present disclosure may be implemented in many different forms, and is not limited to that discussed herein. In the drawings, parts unrelated to the description may be omitted for clarity, and like numerals may refer to like elements throughout the specification.

According to an embodiment of the present disclosure, an electronic device for improving sensitivity of a touch button and a method of operating the electronic device may be provided. According to an embodiment of the present disclosure, an electronic device for improving sensitivity of a touch button by controlling charging and/or discharging of a capacitor connected to the touch button, and a method of operating the electronic device may be provided.

According to an embodiment of the present disclosure, an electronic device that is able to prevent a wrong (erroneous) decision of a touch input due to noise by spreading an operating frequency for charging and/or discharging the capacitor connected to the touch button, and a method of operating the electronic device may be provided. The term "wrong decision" as used herein may also be interchangeably used with misrecognition or misidentification.

According to an embodiment of the present disclosure, by spreading an operating frequency for charging and/or discharging the capacitor connected to the touch button, the electronic device may correctly determine whether a touch input occurs on the touch button even when noise having almost a similar frequency to the operating frequency comes in from outside (e.g., a power line).

In an embodiment of the present disclosure, the spreading of the operating frequency may refer to spreading n (e.g., 2 to 32) frequencies in a frequency range of the fixed operating frequency ±X (e.g., 2 to 10%), where n is a positive integer greater than one (1), and X is a positive value greater than zero (0). That is, the spreading of the operating frequency may refer to using frequencies into which the fixed operating frequency (and/or clock frequency) is spread by a spread spectrum clock (SSC) to determine whether a touch input occurs in the electronic device. An operation of spreading the operating frequency is described with reference to FIG. 3. X and n may be determined based on, but not limited to, at least one of a specification of the electronic device (e.g., power consumption of the electronic device, operation speed of the processor, a resource of the electronic device for carrying out an embodiment of the present disclosure, or the like) and an amount of noise (e.g., noise in a frequency band of 100 kilohertz (kHz) to 200 megahertz (MHz)) likely to be introduced to the electronic device. For example, the noise likely to be introduced may be and/or may include harmonic noise in a certain band (e.g., 6 MHz), without being limited thereto.

The amount of noise likely to be introduced to an electronic device may be measured based on a charging time of a capacitor C1. For example, the amount of noise likely to be introduced may be measured according to a value by which a first difference value d1 exceeds a second difference value d2. The first difference value d1 may represent a value of a difference between a charging time t (or current charging time) of the capacitor C1 measured while no touch input occurs and a normal charging time t1 of the capacitor C1 while no touch input occurs (e.g., d1=t−t1). The second difference value d2 may represent a value of a difference between a normal charging time t2 of the capacitor C1 while a normal touch input occurs and the normal charging time t1 of the capacitor C1 while no touch input occurs (e.g., d2=t2−t1). When the exceeding value increases, the amount of noise likely to be introduced may increase, and when the exceeding value decreases, the amount of noise likely to be introduced may be reduced.

In an embodiment of the present disclosure, the measuring of the amount of noise likely to be introduced to the electronic device may not limited to above description. For example, the amount of noise likely to be introduced to the electronic device may be measured based on a time value by which the charging time t (or current charging time) of the capacitor C1 measured while a touch input occurs exceeds the normal charging time t2 of the capacitor C1 while a normal touch input occurs. When the exceeding time value increases, the amount of noise likely to be introduced may increase, and when the exceeding time value decreases, the amount of noise likely to be introduced may be reduced.

FIG. 1 is a diagram of an electronic device 100, according to an embodiment of the present disclosure. In an embodiment of the present disclosure, the electronic device 100 may be and/or may include at least one of electronic devices such as, but not limited to, a home appliance (e.g., an oven, an induction oven, a microwave oven, a refrigerator, a washing machine, an air conditioner, a dishwasher, or a garment care device), a vehicle, a mobile device (e.g., a smartphone, a cellular phone, a tablet computer, a digital camera, a personal digital assistant (PDA), or a wearable device), or the like, without being limited thereto.

Figure 4:
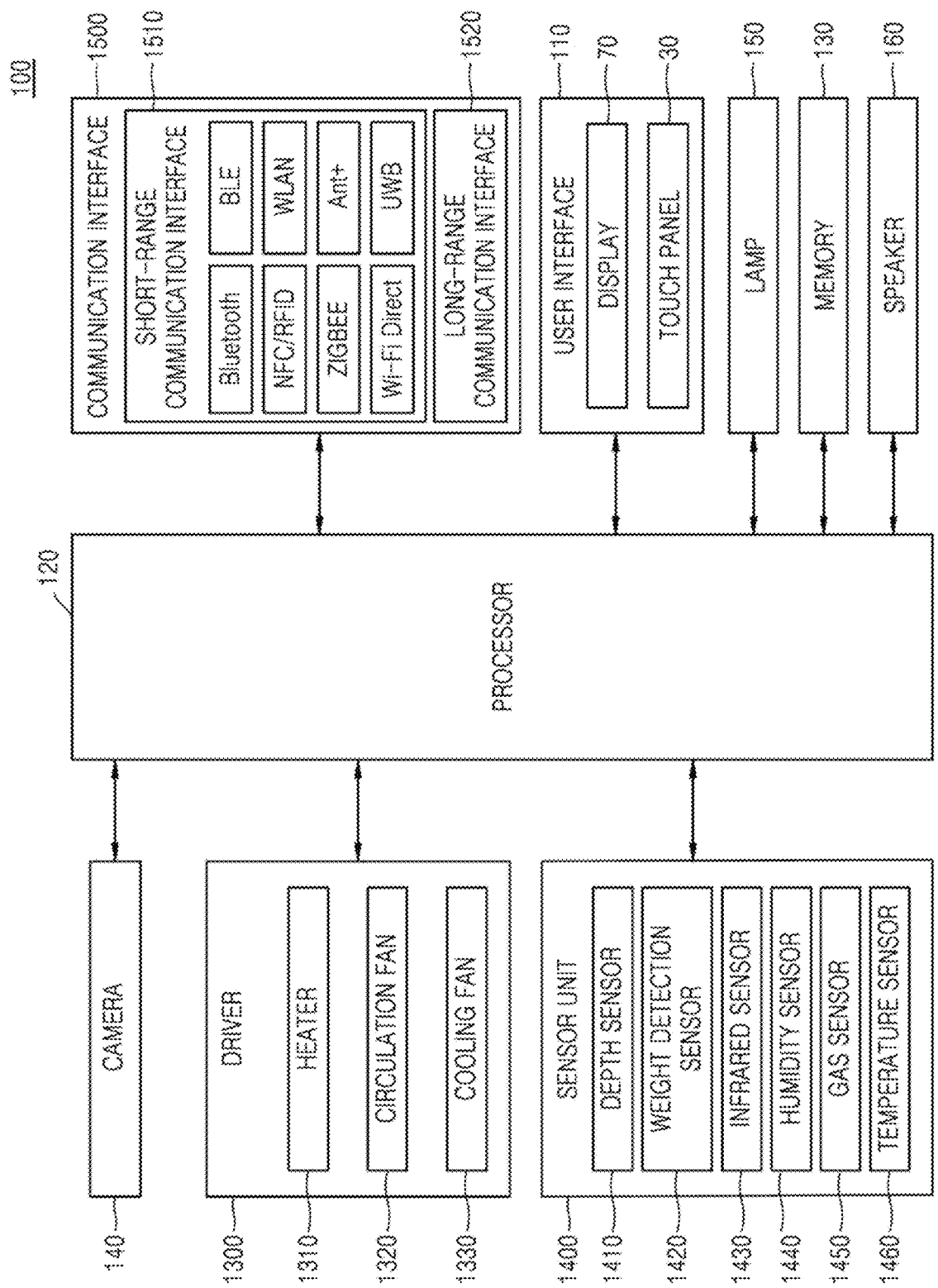
FIG. 4 is a functional block diagram of an electronic device, according to an embodiment of the present disclosure.
Figure 5:
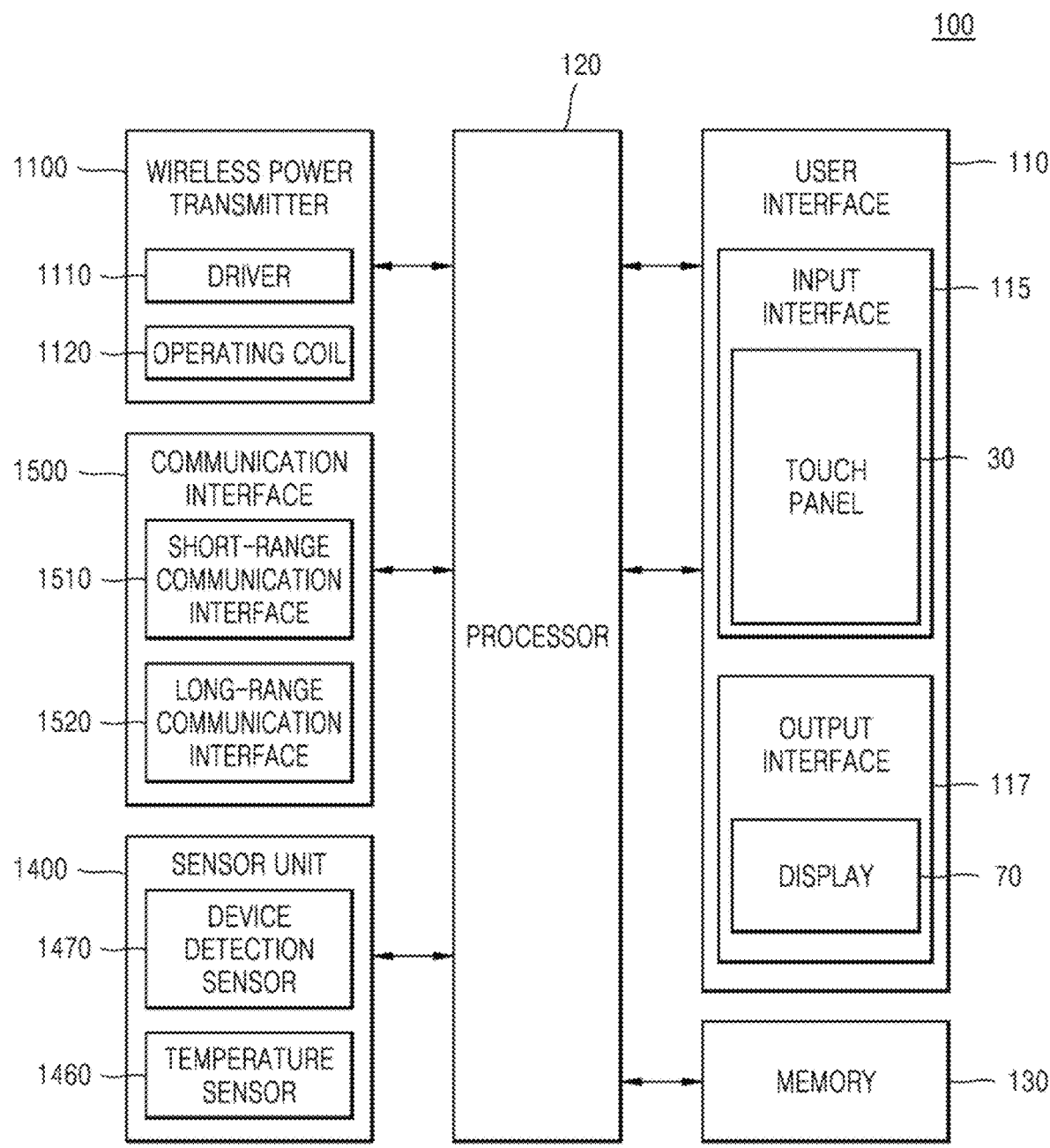
FIG. 5 is a functional block diagram of an electronic device, according to an embodiment of the present disclosure.

The electronic device 100 shown in FIG. 1 may include a touch-based user interface 110 and a processor 120, but the present disclosure is not limited thereto. For example, the electronic device 100 may include such components as shown in FIG. 4 or 5, and may also include an analog-to-digital converter (ADC) between the user interface 110 and the processor 120. The user interface 110 may include a touch panel 30. The touch panel 30 may also be referred to as a touch screen panel and/or a touch screen. The processor 120 may be and/or may include multiple processors and may therefore be referred to as at least one processor or as one or more processors.

Referring to FIG. 1, the touch panel 30, according to an embodiment of the present disclosure, may be configured in a capacitance method. The touch panel 30 may include a touch button 10, a capacitor C1 connected to the touch button 10, and a switch 20 for charging and/or discharging the capacitor C1, but the present disclosure is not limited thereto. In an embodiment of the present disclosure, the charging and/or discharging of the capacitor C1 may refer to charging and/or discharging the capacitor C1. For example, the touch panel 30 may include a plurality of touch buttons 10, a plurality of capacitors C1 connected to the plurality of touch buttons 10, respectively, and a plurality of switches 20 for charging and/or discharging the plurality of capacitors C1, respectively. For example, the plurality may be represented as X×Y, where X and Y are each in the range of 1 to n, and n is a positive integer greater than one (1), but the present disclosure is not limited thereto. Hence, the touch panel 30 may be described as including at least one touch button 10, at least one capacitor C1 corresponding to the at least one touch button 10, and at least one switch 20 corresponding to the at least one capacitor C1.

The user interface 110 may receive a user input through the at least one touch button 10. The user input may be received when a finger 5 of the user approaches and/or touches the touch button 10. The user input may be referred to as a touch input that occurs when the finger 5 of the user approaches and/or touches the touch button 10. Hence, the receiving of the user input may also be expressed as a touch input occurring. Although FIG. 1 illustrates the finger 5 of the user as approaching and/or touching the touch button 10, the present disclosure is not limited thereto. For example, when a capacitive touch pen approaches and/or touches the touch button 10, the user interface 110 may receive the user input.

The user interface 110 may be described as including the at least one touch button 10. It may be described that the user interface 110 may include at least one touch button 10, at least one capacitor C1 corresponding to the at least one touch button 10, and the switch 20 for charging and/or discharging the at least one capacitor C1. The user interface 110 may be described as including the touch panel 30 including the at least one touch button 10. It may be described that the user interface 110 may include the touch panel 30 including at least one touch button 10, at least one capacitor C1 corresponding to the at least one touch button 10, and the switch 20 corresponding to the at least one capacitor C1. The switch 20 may be connected between a power source Vcc and the capacitor C1 and turned on and/or off to charge and/or discharge the capacitor C1.

The user interface 110 may include the at least one touch button 10, the capacitor C1 connected to the at least one touch button 10, and the switch 20 connected between the at least one touch button 10 and the capacitor C1 and used to charge and/or discharge the capacitor C1.

In an embodiment of the present disclosure, the touch button 10 may detect approaching and/or touching of the finger 5 of the user. The touch button 10 may also be referred to as a touch sensor for detecting approaching and/or touching of the finger 5 of the user. The touch button 10 may have a structure of being mapped to a touch sensor. The finger 5 of the user may also be referred to as a body part of the user, but the present disclosure is not limited thereto. The touch button 10 may detect approximating and/or touching of a capacitive touch pen other than the finger 5 of the user. The touch button 10 may be configured by coating a special conductive metal material, tin antimony oxide (TAO), on both sides of a substrate to form a transparent electrode (indium tin oxide (IOT)), allowing a certain amount of current to flow on the glass surface. However, the present disclosure is not limited in this regard, and the touch button 10 may be coated with various other materials that allow an amount of current to flow on the glass surface. The transparent electrode may be formed with a film or glass. The transparent electrode may be formed such that the X-axis and the Y-axis cross each other.

The switch 20 may be connected between the power source Vcc and the capacitor C1 and may be controlled by the processor 120 to be turned on and/or off. The switch 20 may be turned on and/or turned off according to a control signal sent from the processor 120. The capacitor C1 may be charged and/or discharged depending on whether the switch 20 is turned on and/or off. The control signal transmitted from the processor 120 may be based on a certain number of frequencies into which an operating frequency of the switch 20 may be spread within a certain frequency range. The switch 20 may be described as being turned on and/or off based on the certain number of frequencies into which the operating frequency is spread within the certain frequency range.

The processor 120 may measure the charging time t of the capacitor C1 according to the switch 20 being turned on and/or off. The measuring of the charging time t of the capacitor C1 may be described as obtaining a charging time t1 of the capacitor C1. The measuring of the charging time t of the capacitor C1 may be described as measuring capacitance C of the capacitor C1. This is because the capacitance of the capacitor C1 may be proportional to the charging time t of the capacitor C1.

When no touch input occurs on the touch button 10, the normal charging time t1 of the capacitor C1 may have a charging time corresponding to the capacitance (or intrinsic parasitic capacitance) C (=C1) of the capacitor C1. When a normal touch input occurs on the touch button 10, the normal charging time t2 of the capacitor C1 may have a charging time corresponding to a combination of the capacitance of the capacitor C1 and capacitance of a capacitor Cf (or capacitance of the finger 5 of the user) (e.g., C=C1+Cf). When a normal touch input on a touch pen basis occurs on the touch button 10, the normal charging time t2 of the capacitor C1 may have a charging time corresponding to a combination of the capacitance of the capacitor C1 and capacitance Cf' of the touch pen (e.g., C=C1+Cf').

The charging time t of the capacitor C1 may be represented by a value obtained by counting the time taken for a voltage corresponding to the capacitance of the capacitor C1 to reach a reference voltage, which may be referred to as the RC (Resistance-Capacitance) delay time. When no touch input occurs on the touch button 10, the reference voltage may be a voltage when the capacitance of the capacitor C1 is C1, and when a normal touch input occurs on the touch button 10, the reference voltage may be a voltage when the capacitance of the capacitor C1 is C1+Cf (or C1+Cf'). Hence, when the capacitance C of the capacitor C1 increases, the charging time (RC delay time) of the capacitor C1 may increase as well. The charging time of the capacitor C1 may also be represented by a raw count or real-time sensing value for the touch button 10.

Figure 2:
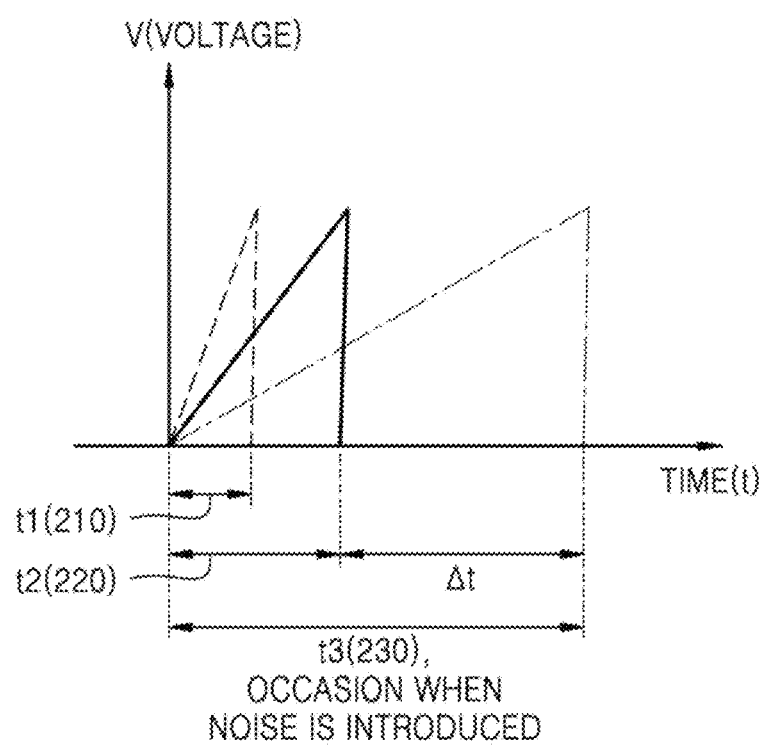
FIG. 2 is a diagram of a charging time of a capacitor in an electronic device, according to an embodiment of the present disclosure.

FIG. 2 is a diagram of a charging time of the capacitor C1 included in the touch panel 30 in the electronic device 100, according to an embodiment of the present disclosure.

For example, when no touch input occurs through the touch button 10 and the first normal charging time t1 of the capacitor C1 is measured as shown in 210 of FIG. 2, the second normal charging time t2 of the capacitor C1 when a normal touch input occurs through the touch button 10 may be measured as shown in 220 of FIG. 2. As shown in the first and second normal charging times t1 210 and t2 220 of FIG. 2, when the normal touch input occurs (or there is a normal touch input) through the touch button 10, the capacitance C of the capacitor C1 becomes a combination of capacitances of the capacitor C1 and the capacitor Cf having a parallel structure (e.g., C=C1+Cf), so the delay time (RC delay time) until the reference voltage is reached may increase as compared to when no touch input occurs (or there is no touch input).

When a frequency of the noise introduced from outside of the electronic device 100 (e.g., noise introduced through the power line) is substantially similar to and/or the same as the operating frequency at which to turn on and/or off the switch 20, a measured charging time t3 of the capacitor C1 may be longer than the normal charging time t2 of the capacitor C1 by a first time $\Delta t$ when a normal touch input occurs on the touch button 10 as shown in a third normal charging time t3 230 of FIG. 2. The first time $\Delta t$ may be determined depending on the amount of the introduced noise. For example, the larger the amount of the introduced noise is, the longer the first time $\Delta t$ may be, and the smaller the amount of the introduced noise is, the shorter the first time $\Delta t$ may be. In an embodiment of the present disclosure, a certain frequency range and a certain number of frequencies may be determined depending on the amount of noise likely to be introduced to the electronic device 100. For example, when the amount of noise likely to be introduced to the electronic device 100 corresponds to the first time Δt as shown in FIG. 2, the certain frequency range may be equal to the operating frequency ±10%, and the certain number of frequencies may be 16. As another example, when the amount of noise likely to be introduced to the electronic device 100 exceeds the first time Δt as shown in FIG. 2, the certain frequency range may be the operating frequency ±12%, and the certain number of frequencies may be 18. As another example, when the amount of noise likely to be introduced to the electronic device 100 is less than the first time Δt as shown in FIG. 2, the certain frequency range may be the operating frequency ±8%, and the certain number of frequencies may be 14. The amount of noise likely to be introduced to the electronic device 100, the certain frequency range and the certain number of frequencies are not limited thereto.

Figure 3:
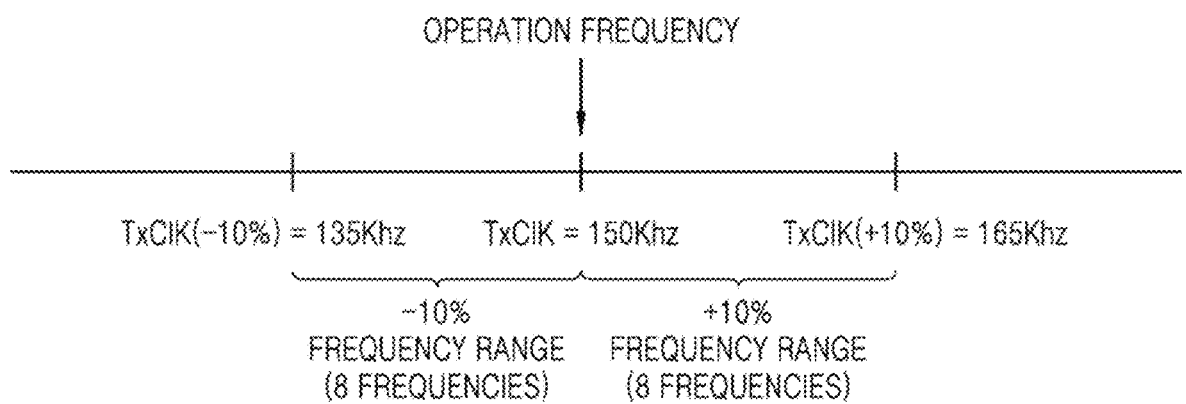
FIG. 3 is a diagram of an example of spreading an operating frequency into a certain number of frequencies in a certain frequency range in an electronic device, according to an embodiment of the present disclosure.

FIG. 3 is a diagram illustrating an example of spreading the operating frequency in the electronic device 100, according to an embodiment of the present disclosure.

FIG. 3 shows a case that the operating frequency at which to control the switch 20 to be turned on and/or off is 150 kHz. The operating frequency may be one fixed in the electronic device 100 at first. As shown in FIG. 3, the processor 120 included in the electronic device 100 may spread the operating frequency into a certain number (e.g., 16) of frequencies within a certain frequency range (e.g., the operating frequency ±10%) to control the switch 20 to be turned on and/or off. Information regarding the certain frequency range and the certain number of spread frequencies may be stored in the memory 130 included in the electronic device 100 and may be read out and used by the processor 120, but the present disclosure is not limited thereto. For example, the processor 120 may be configured to spread the operating frequency into a certain number of frequencies within a certain frequency range.

In an embodiment of the present disclosure, the certain frequency range and the certain number may be dynamically set according to an amount of noise likely to be introduced to the electronic device 100. For example, considering a case when the charging time t of the capacitor C1 measured based on the amount of noise introduced to the electronic device 100 corresponds to the third normal charging time t3 230 as shown in FIG. 2 and the third normal charging time t3 may be maintained for a certain time (e.g., 5 minutes, 30 minutes, or the like), the electronic device 100 may store, in the memory 130, information about a frequency range and the number of frequencies, at least one of which may be increased more than the example shown in FIG. 3. The electronic device 100 may use the information about the frequency range and the number of frequencies stored in the memory 130 to spread the operating frequency. For example, the electronic device 100 may store information about the frequency range increased by ±2 KHz more than the example shown in FIG. 3 in the memory 130 and use the information to spread the operating frequency. For example, the electronic device 100 may store information about the number of frequencies increased by two (2) more than the example shown in FIG. 3 in the memory 130 and use the information to spread the operating frequency. As another example, the electronic device 100 may store information about an increase by ±2 kHz more than the example shown in FIG. 3 and an increase of the number of frequencies by 2 more than the example shown in FIG. 3 in the memory 130 and use the information to spread the operating frequency.

For example, when the charging time t of the capacitor C1 measured according to the amount of noise introduced to the electronic device 100 is shorter than the third normal charging time t3 230 shown in FIG. 2 and longer than the second normal charging time t2 220 shown in FIG. 2, the amount of noise likely to be introduced to the electronic device 100 is smaller than the amount of noise during the third normal charging time t3 230 shown in FIG. 2, so the electronic device 100 may store information about at least one of the frequency range or the number of frequencies reduced further than the example shown in FIG. 3 in the memory 130 and use the information to spread the operating frequency. As another example, the electronic device 100 may store information about a decrease by ±2 kHz further than the example shown in FIG. 3 in the memory 130 and use the information to spread the operating frequency. As another example, the electronic device 100 may store information about the number of frequencies reduced by two (2) less than the example shown in FIG. 3 in the memory 130 and use the information to spread the operating frequency. As another example, information about a decrease by ±2 kHz further than the example shown in FIG. 3 and a decrease of the number of frequencies by two (2) less than the example shown in FIG. 3 may be stored in the memory 130 and used to spread the operating frequency.

In a case of spreading an operating frequency of 150 kHz as in the example shown in FIG. 3, the processor 120 of the electronic device 100 may spread the operating frequency 150 kHz into eight (8) frequencies between 135 kHz to 150 kHz and eight (8) frequencies between 150 kHz to 165 kHz based on the operating frequency of 150 kHz. For example, the processor 120 may spread the operating frequency into eight (8) frequencies (e.g., 135 kHz, 137 kHz, 139 kHz, 141 kHz, 143 kHz, 145 kHz, 147 kHz and 149 kHz), and another eight (8) frequencies (e.g., 151 kHz, 153 kHz, 155 kHz, 157 kHz, 159 kHz, 161 kHz, 163 kHz and 165 kHz), with gaps of 2 kHz. However, the present disclosure is not limited in this regard.

The electronic device 100 may control the switch 20 to be turned on and/or off by switching between the spread 16 frequencies. For example, in the case that 16 frequencies include the eight (8) frequencies (e.g., 135 kHz, 137 kHz, 139 kHz, 141 kHz, 143 kHz, 145 kHz, 147 kHz and 149 kHz), and the other eight (8) frequencies (e.g., 151 kHz, 153 kHz, 155 kHz, 157 kHz, 159 kHz, 161 kHz, 163 kHz and 165 kHz) the processor 120 may control the switch 20 to be turned on and/or off based on a frequency of 165 kHz. The processor 120 may then control the switch 20 to be turned on and/or off based on a frequency of 163 kHz. The processor 120 may then control the switch 20 to be turned on and/or off based on a frequency of 161 kHz. The processor 120 may then control the switch 20 to be turned on and/or off based on a frequency of 159 kHz. The processor 120 may then control the switch 20 to be turned on and/or off based on a frequency of 157 kHz. The processor 120 may then control the switch 20 to be turned on and/or off based on a frequency of 155 kHz. The processor 120 may then control the switch 20 to be turned on and/or off based on a frequency of 153 kHz. The processor 120 may then control the switch 20 to be turned on and/or off based on a frequency of 151 kHz. The processor 120 may then control the switch 20 to be turned on and/or off based on a frequency of 149 kHz. The processor 120 may then control the switch 20 to be turned on and/or off based on a frequency of 147 kHz. The processor 120 may then control the switch 20 to be turned on and/or off based on a frequency of 145 kHz. The processor 120 may then control the switch 20 to be turned on and/or off based on a frequency of 143 kHz. The processor 120 may then control the switch 20 to be turned on and/or off based on a frequency of 141 kHz. The processor 120 may then control the switch 20 to be turned on and/or off based on a frequency of 139 kHz. The processor 120 may then control the switch 20 to be turned on and/or off based on a frequency of 137 kHz. The processor 120 may then control the switch 20 to be turned on and/or off based on a frequency of 135 kHz.

The switching between the spread frequencies is not limited to the sequential switching as described above. For example, the processor 120 may use one frequency multiple times to control the switch 20 to be turned on and/or off. For example, the processor 120 may use a frequency of 165 kHz multiple times (e.g., three (3) to eight (8) times) to control the switch 20 to be turned on and/or off. The processor 120 may sequentially switch and use frequencies from 163 kHz to 135 kHz multiple times (e.g., three (3) to eight (8) times) to control the switch 20 to be turned on and/or off. Furthermore, the processor 120 may control the switch 20 to be turned on and/or off based on frequencies from 135 kHz to 165 kHz that are switched sequentially in a reverse order to what is described above.

The processor 120 may control the switch 20 to be turned on and/or off based on the spread frequency (and/or a clock frequency), and measure the charging time t of the capacitor C1 according to the turning on and/or off of the switch 20. The processor 120 controlling the switch 20 to be turned on and/or off based on the spread frequency may be said that the processor 120 controls the switch 20 to be turned on and/or off by transmitting a control signal that is based on the spread frequency to the switch 20. The processor 120 may obtain the first difference value d1 between the measured charging time t of the capacitor C1 and the normal charging time t1 of the capacitor C1 when no touch input occurs on the touch button 10 (e.g., d1=t−t1). The measured charging time t of the capacitor C1 may be an average value of a certain number of charging times of the capacitor C1, which may be measured according to turning on and/or off of the switch 20 based on a certain number of frequencies. For example, in a case of controlling the switch 20 to be turned on and/or off by using 16 frequencies, the processor 12 may obtain an average value of 16 measured charging times of the capacitor C1 as the measured charging time t (or a current charging time) of the capacitor C1.

The processor 120 may compare the obtained first difference value d1 with a threshold. The threshold may be a second difference value d2 which may be the difference between the charging time t2 of the capacitor C1 when a normal touch input occurs on the touch button 10 and the normal charging time t1 of the capacitor C1 when no touch input occurs on the touch button 10 (e.g., d2=t2−t1).

When the first difference value d1 exceeds the threshold as a result of comparing the first difference value d1 with the threshold, the processor 120 may determine that a touch input occurs on the touch button 10. When the first difference value d1 is less than or equal to the threshold, the processor 120 may determine that no touch input occurs on the touch button 10.

The processor 120 may include at least one of a central processing unit (CPU), a graphics processing unit (GPU), an accelerated processing unit (APU), a many integrated core (MIC), a digital signal processor (DSP) or a neural processing unit (NPU). The processor 120 may be implemented in the form of a system on chip (SoC) with one or more electronic components integrated therein. Each processor 1230 may be implemented in separate hardware (H/W). The processor 120 may also be referred to as a microprocessor controller (MICOM), a micro processor unit (MPU), or a micro controller unit (MCU). The processor 120 may be implemented with a single core processor or a multi-core processor.

Based on an artificial intelligence (AI) model, the processor 120 may use the certain number of frequencies spread from the operating frequency within the certain frequency range to control the switch 20 to be turned on and/or off, measure the charging time t of the capacitor C1, and determine whether a touch input occurs on the touch button 10 based on the measured charging time t of the capacitor C1. The processor 120 may input the measured charging time t of the capacitor C1, a result value of the determining whether a touch input occurs on the touch button 10, and the operation result of the electronic device 100 to the AI model and train the AI model on a method for operating the electronic device 100 to determine the presence of a touch input.

The AI model may be referred to as a pre-trained AI model (e.g., a support vector machine (SVM) algorithm). The pre-trained AI model may include, but not be limited to, at least one of an SVM model, a neural network model, a random forest model, or a graphical model. The SVM model may have a relatively high accuracy and a relatively fast response speed, enabling an operation of the electronic device 100 to be relatively quickly switched to an optimal specification, so the AI model disclosed in an embodiment of the present disclosure may be the SVM model. The SVM model may be developed (or trained) through supervised learning. The SVM model may be and/or may include a model that may identify which group newly input data belongs to from among groups learned after being trained with labeled training data. In an embodiment of the present disclosure, the SVM model may be trained by using a charging time and capacitance of the capacitor C1, an operating frequency fixed at first, information about a frequency range and the number of frequencies based on the configuration of the touch panel 30 included in the electronic device 100 as training data.

FIG. 4 illustrates the electronic device 100, according to an embodiment of the present disclosure. The electronic device 100 shown in FIG. 4 may be represented as an electronic oven or an oven. However, the present disclosure is not limited in this regard, and the electronic device 100 may be and/or may include other home appliances (e.g., induction ovens, microwave ovens, refrigerators, washing machines, air conditioners, dishwashers, and garment care devices), vehicles, mobile devices (e.g., smartphones, cellular phones, tablet computers, digital cameras, personal digital assistants (PDA), or wearable devices), or the like.

The electronic device 100 shown in FIG. 4 may include the user interface 110, the processor 120, the memory 130, a camera 140, a lamp 150, a speaker 160, a driver 1300, a sensor unit 1400, and a communication interface 1500, but not all the components shown in FIG. 4 may be essential for the electronic device 100.

The user interface 110 may include the touch panel 30 and a display 70 as shown in FIG. 4, but the present disclosure is not limited thereto. For example, the user interface 110 may include, but not limited to, at least one of a key pad, a dome switch, a jog wheel, a jog switch and a micro phone. The microphone may be included in the sensor unit 1400.

The touch panel 30 may include, as described above with reference to FIG. 1, the at least one touch button 10, the capacitor C1 connected to the at least one touch button 10, and the switch 20 for charging and/or discharging the capacitor C1. The switch 20 may be turned on and/or turned off according to a control signal transmitted from the processor 120 to charge and/or discharge the capacitor C1. The processor 120 may measure the charging time t of the capacitor C1 according to the switch 20 being turned on and/or off. The switch 20 being turned on and/or off according to the control signal transmitted from the processor 120 may be described that the switch 20 is turned on and/or off based on the frequencies spread by the processor 120.

The display 70 may be controlled by the processor 120 to display a monitored image of an inside space (e.g., a cooking chamber) of the electronic device 100, recipe information for food ingredients, cooking temperature information, or the like, but the present disclosure is not limited thereto. The display 70 may include at least one of a liquid crystal display (LCD), a thin film transistor-liquid crystal display (TFT-LCD), light emitting diodes (LEDs), organic LEDs (OLEDs), a flexible display, a three-dimensional (3D) display, an electrophoretic display, or the like. Depending on the form of implementation of the electronic device 100, two (2) or more displays 70 may be included. The display 70 may also be referred to as an output interface in a case of being separated from the touch panel 30. The display 70 may be used as an input/output interface in a case of having a layered structure with the touch panel 30 into a touch screen.

The display 70 may display touch data (e.g., touch location information) corresponding to the touch input received through the touch button 10. For example, the touch data corresponding to the touch input on the touch button 10 may be displayed in real time. For example, touch data (e.g., information indicating a cooking time, menu check, or the like) corresponding to a touch input on the touch button 10 may be displayed in real time. The displayed touch data may be referred to as a result data, response data or feedback data of the electronic device 100 corresponding to the touch input on the touch button 10.

The processor 120 may control general operation of the electronic device 100. The processor 120 may execute a program stored in the memory 130 to control operations of the user interface 110, the camera 140, the lamp 150, the speaker 160, the driver 1300, the sensor unit 1400 and the communication interface 1500.

As described above with reference to FIG. 1, the processor 120 may spread the operating frequency into a certain number of frequencies in a certain frequency range, control the switch 20 to be turned on and/or off based on the spread frequencies, measure the charging time t of the capacitor C1 according to the turning on or off of the switch 20, and determine whether a touch input occurs on the touch button 10 based on the measured charging time t. The controlling of the switch 20 to be turned on and/or off based on the spread frequency may be described as controlling the switch 20 to be turned on and/or off by transmitting a control signal that is based on the spread frequency to the switch 20.

At least one instruction to be executed by the processor 120 may be stored in the memory 130. At least one program to be executed by the processor 120 may be stored in the memory 130. A program for performing a method of operating the electronic device 100 according to an embodiment of the present disclosure may be stored in the memory 130. Information about the certain frequency range and the certain number of frequencies may be stored in the memory 130. For example, information for spreading the operating frequency (e.g., information about a frequency range of the operating frequency ±10% and information about the number (e.g., 16) of frequencies), information about a threshold for determining whether there is a touch input (e.g., the second difference value d2 between the charging time t2 of the capacitor C1 when there is a normal touch input occurring on the touch button 10 and the charging time t1 of the capacitor C1 when no touch input occurs on the touch button 10), and the charging time t1 of the capacitor C1 when no touch input occurs on the touch button 10 may be stored in the memory 130.

An AI model may be stored in the memory 130. The memory 130 may store an AI model for determining whether there is a touch input occurring on the touch button 10, an AI model for object recognition, an AI model for recipe recommendation, or the like.

The memory 130 may include at least one type of storage medium including, but not limited to, a flash memory, a hard disk, a multimedia card micro type memory, a card type memory (e.g., a secure digital (SD) card memory, an extreme digital (XD) card memory, or the like), a random access memory (RAM), a static random access memory (SRAM), a read-only memory (ROM), an electrically erasable programmable read-only memory (EEPROM), a programmable ROM (PROM), a magnetic memory, a magnetic disk, and an optical disk. The programs stored in the memory 130 may be classified into multiple modules on a function basis. The information stored in the memory 130 may be read out and used by the processor 120.

The camera 140 may be controlled by the processor 120 to capture the inside space (e.g., a cooking chamber) of the electronic device 100. The camera 140 may be and/or may include a subminiature camera or a pinhole camera. The camera 140 may be durable to withstand high heat and electromagnetic waves, and may also be water proof. The camera 140 may be wound with a coiled hot wire to prevent formation of frost. Depending on the implementations or design constraints, multiple cameras 140 may be installed in the inside space (e.g., a cooking chamber) of the electronic device 100. An installation location of the camera 140 may be determined by taking into account an installation location of a heater 1310 included in the driver 1300. In a case that the electronic device 100 is an oven, the inside space (e.g., cooking chamber) may be formed within a main body to have an open front. The camera 140 may also be installed in an upper portion of the inside space (e.g., cooking chamber) at which to capture the inside space (e.g., cooking chamber). The camera 140 may also be installed by taking into account a door that opens or closes the inside space (e.g., cooking chamber). The inside space (e.g., cooking chamber) of the electronic device 100 may refer to a cooking chamber of an oven.

The lamp 150 may be arranged on one surface of the inside space (e.g., cooking chamber) of the electronic device 100 and may refer to an interior lamp. For example, the lamp 150 may be arranged on the ceiling of the inside space (e.g., cooking chamber) or in an upper portion of the inside space (e.g., cooking chamber) of the electronic device 100. The lamp 150 may be arranged on a side surface of the inside space (e.g., cooking chamber) of the electronic device 100. The location at which the lamp 150 is arranged may not be limited to what are described above. For example, the lamp 150 may be arranged at an upper corner of the inside space (e.g., cooking chamber) of the electronic device 100. The lamp 150 may be turned on when the door of the electronic device 100 is open or when the electronic device 100 operates. Operation of the lamp 150 may be controlled by the processor 120. The lamp 150 may be protected by a glass cover. The lamp 150 may be turned off after a certain time has passed since the lamp 150 was turned on. The lamp 150 may be turned off at the request to stop monitoring or to stop AI recognition on the inside space (e.g., cooking chamber).

The lamp 150 may have multiple brightness levels. For example, the lamp 150 may be controlled by the processor 120 to emit light from a dark level to bright level. The lamp 150 may be a halogen lamp. The lamp 150 may be an LED light. However, the present disclosure is not limited in this regard, and, for example, the lamp 150 may be a lamp with various colors.

The speaker 160 may be controlled by the processor 120 to output a notification sound related to an operation of the electronic device 100. The speaker 160 may be controlled by the processor 120 to output a guidance sound related to an operation of the electronic device 100. The speaker 160 may be configured to be included in the user interface 110. The speaker 160 may output a guidance sound corresponding to a touch input that occurs on the touch button 10, allowing the user to confirm the touch input from the user. The speaker 160 may also be referred to as a sound output unit.

The driver 1300 may include the heater 1310, a circulation fan 1320, or a cooling fan 1330, but the present disclosure is not limited thereto. The heater 1310 may heat food in the inside space (e.g., cooking chamber) of the electronic device 100. The heater 1310 may be an electric heater including an electric resistor or a gas heater that produces heat by burning a gas. The circulation fan 1320 may be installed in the back of the inside space (e.g., cooking chamber) of the electronic device 100 to circulate air in the inside space for the food to be evenly heated. A circulation motor for driving the circulation fan 1320 may be arranged in the inside space (e.g., cooking chamber) of the electronic device 100. Furthermore, a fan cover may be arranged in front of the circulation fan 1320 to cover the circulation fan 1320, and may be formed in the fan cover to allow air to flow. The cooling fan 1330 may be a centrifugal fan that sucks in air from above and discharges the air in a radial direction. The cooling fan 1330 may be arranged in a cooling path. The cooling fan 1330 may include a rotation plate formed flatly, a hub formed in the middle of the rotation plate and coupled with a rotation shaft of a cooling motor, and a plurality of wings formed from the center to edges of the rotation plate. The hub may be shaped like a cone that has an increasing radius toward the bottom. Hence, the hub may diffuse the air sucked in from above to the radial direction.

The sensor unit 1400 may include, but the present disclosure is not limited thereto, at least one of a depth sensor 1410, a weight detection sensor 1420, an infrared sensor 1430, a humidity sensor for sensing humidity of the inside space, a gas sensor 1450 for sensing an amount of gas in the inside space or a temperature sensor 1460. Those of ordinary skill in the art may intuitively infer the functions of the respective sensors by their names, so detailed description thereof may be omitted for the sake of brevity.

Figure 9:
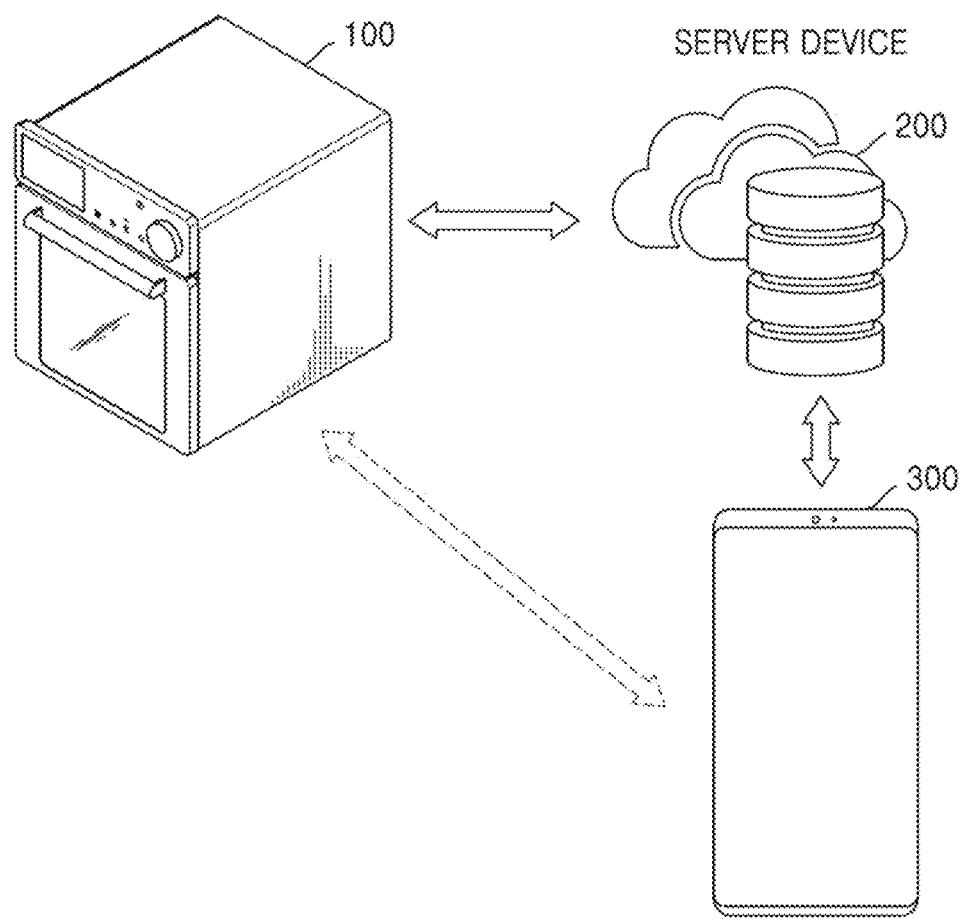
FIG. 9 is a diagram of operations associated with an electronic device, a server device and a user equipment, according to an embodiment of the present disclosure.

The communication interface 1500 may include one or more components for performing communication between the electronic device 100 and a server device 200 shown in FIG. 9, or between the electronic device 100 and a user equipment 300 shown in FIG. 9. For example, the communication interface 1500 may include a short-range communication interface 1510, a long-range communication interface 1520, or the like.

The short-range communication interface 1510 may include at least one of a Bluetooth™ communication unit, a Bluetooth™ low energy (BLE) communication unit, a near field communication unit (NFC), a wireless local area network (WLAN) (e.g., wireless-fidelity (Wi-Fi) communication unit, a Zigbee communication unit, an infrared data association (IrDA) communication unit, a Wi-Fi direct (WFD) communication unit, an ultra wideband (UWB) communication unit, or an Ant+ communication unit), but the present disclosure is not limited thereto.

The long-range communication interface 1520 may be used to communicate with the server device 200 when the electronic device 100 is remotely controlled by the server device 200 in an Internet of Things (IoT) environment. The long-range communication interface 1520 may include at least one of the Internet, a computer network (e.g., a local area network (LAN) or wide area network (WAN)), or a mobile communication unit. The mobile communication unit may include at least one of a third generation (3G) module, a fourth generation (4G) module, a fifth generation module (5G) module, a long term evolution (LTE) module, a narrowband Internet of Things (NB-IoT) module or a long term evolution for machines (LTE-M) module, but the present disclosure is not limited thereto.

FIG. 5 is a functional block diagram of the electronic device 100, according to an embodiment of the present disclosure. The electronic device 100 shown in FIG. 5 may be represented by an induction or a wireless power transmission device.

Referring to FIG. 5, the electronic device 100 may include the user interface 110, the processor 120, the memory 130, a wireless power transmitter 1100, the communication interface 1500 and the sensor unit 1400.

The user interface 110 may include an input interface 115 and an output interface 117.

The input interface 115 may be configured for receiving inputs from the user. The input interface 115 may include the touch panel 30 according to an embodiment of the present disclosure, but the present disclosure is not limited thereto. For example, the input interface 115 may be and/or may include at least one of a key pad, a dome switch, a jog wheel, a jog switch or a microphone, but the present disclosure is not limited thereto. The microphone may be included in the sensor unit 1400.

The touch panel 30 may be configured in a capacitive method, as shown in FIG. 1. The touch panel 30 may include at least one touch button 10, the capacitor C1 connected to the touch button 10, and the switch 20 for charging and/or discharging the capacitor C1, but the present disclosure is not limited thereto. The switch 20 is turned on and/or off based on the frequencies spread by the processor 120 (a certain number of frequencies spread from the operating frequency in a certain range). Hence, the processor 120 may determine whether a touch input occurs on the touch button 10 by measuring the charging time t of the capacitor C1.

The output interface 117 is for outputting audio or video signals, and may include the display 70 and a sound output unit (e.g., a speaker). The output interface 117 may display at least one piece of information indicating a power level, cooking time and/or menu check of the electronic device 100 on the display 70. The output interface 117 may output at least one piece of information indicating a power level, cooking time and/or menu check of the electronic device 100 through the sound output unit (e.g., a speaker) in the form of notification sound or guidance sound.

The display 70 may include at least one of a liquid crystal display (LCD), a thin film transistor-liquid crystal display (TFT-LCD), light emitting diodes (LEDs), organic LEDs (OLEDs), a flexible display, a three-dimensional (3D) display, or an electrophoretic display. The display 70 may display touch data (e.g., touch location information) corresponding to the touch input received through the touch button 10. For example, the touch data corresponding to the touch input on the touch button 10 may be displayed in real time. For example, touch data (e.g., information indicating a power level, a cooking time and/or menu check) corresponding to a touch input on the touch button 10 may be displayed in real time. The displayed touch data may be mentioned as a result data, response data or feedback data of the electronic device 100 corresponding to the touch input on the touch button 10.

The memory 130 may store a program (or instructions) for processing and controlling of the processor 120, and even store input/output data and data associated with the touch panel 30 (e.g., information about a certain frequency range and a certain number of frequencies, thresholds, the normal charging time t1 of the capacitor C1, or the like). An AI model (or a learning model) may be stored in the memory 130.

The memory 130 may include at least one type of storage medium including a flash memory, a hard disk, a multimedia card micro type memory, a card type memory (e.g., SD or XD memory), a RAM, an SRAM, a ROM, an EEPROM, a PROM, a magnetic memory, a magnetic disk, and an optical disk. Furthermore, the electronic device 100 may operate a web storage or a cloud server that performs a storage function on the Internet.

The wireless power transmitter 1100 may include a driver 1110 and an operating coil 1120, but the present disclosure is not limited thereto. The driver 1110 may receive power from an external power source and supply a current to the operating coil 1120 according to a driving control signal of the processor 120. The driver 1110 may include, but not limited to, an electromagnetic interference (EMI) filter, a rectifying circuit, an inverter circuit, a current detection circuit, and a driving processor.

The EMI filter may cut off high frequency noise contained in alternate current (AC) power supplied from the external source (ES), and pass an AC voltage and AC current with a preset frequency (e.g., 50 Hz or 60 Hz). The AC power from which high frequency noise is cut off by the EMI filter may be supplied to the rectifying circuit. The rectifying circuit may convert the supplied AC power to direct current (DC) power. The inverter circuit may include a switching circuit for supplying or blocking the driving current to the operating coil 1120. The switching circuit may be turned on and/or off by a driving control signal of the driving processor. By turning on or off the switching circuit, the magnitude and direction of the current flowing to the operating coil 1120 may be changed. A current detection circuit may include a current sensor for measuring a current output from the inverter circuit. An electric signal corresponding to the measured current value may be transmitted to the driving processor. The driving processor may generate a driving control signal to determine on or off of the switching circuit based on an output intensity (power level) of the electronic device 100.

The operating coil 1120 may produce a magnetic field for heating a cooking container (or cooking device). For example, when a driving current is supplied to the operating coil 1120, a magnetic field may be induced around the operating coil 1120. When a current that changes in magnitude and direction over time (e.g., an AC current) is supplied to the operating coil 1120, a magnetic field that changes in magnitude and direction over time may be induced around the operating coil 1120. The magnetic field around the operating coil 1120 may pass an upper plate formed of tempered glass, and reach the cooking container put on the upper plate. Due to the magnetic field changing in magnitude and direction over time, an eddy current that turns around the magnetic field may be generated to the cooking container. The eddy current may cause electrical resistance heat to the cooking container. The electrical resistance heat is produced to a resistor when a current flows in the resistor, and also referred to as Joule heat. The cooking container may be heated by the electrical resistance heat and contents in the cooking container may be heated.

The processor 120 may control general operation of the electronic device 100. The processor 120 may execute programs stored in the memory 130 to control the wireless power transmitter 1100, the communication interface 1500, the sensor unit 1400, the user interface 110, and the memory 130. The processor 120 may be provided in the plural in some embodiments, and thus, may also referred to as at least one processor and/or as one or more processors. For example, the processor 120 may include a main processor and a subprocessor.

In an embodiment of the present disclosure, the electronic device 100 may be equipped with an AI model based processor. The AI model based processor may be manufactured into the form of a dedicated hardware chip for AI, or manufactured as a portion of the existing universal processor (e.g., a CPU or an AP) or GPU and mounted in the electronic device 100.

The communication interface 1500 may include one or more components that provide communication between the electronic device 100 and the cooking container or between the electronic device 100 and the server device 200 or communication between the electronic device 100 and the user equipment 300. For example, the communication interface 1500 may include a short-range communication interface 1510 and/or a long-range communication interface 1520.

The short-range communication interface 1510 may include at least one of a Bluetooth™ communication interface, a Bluetooth™ low energy (BLE) communication interface, a near field communication interface (NFC), a wireless local area network (WLAN) (e.g., Wi-Fi, communication interface, a Zigbee communication interface, an infrared data association (IrDA) communication interface, a Wi-Fi direct (WFD) communication interface, an ultra wideband (UWB) communication interface, or an Ant+ communication interface), but the present disclosure is not limited thereto.

The long-range communication interface 1520 may be used to communicate with the server device 200 or the user equipment 300 when the cooking container is controlled by the server device 200 or the user equipment 300 remotely in an IoT environment. The long-range communication interface 1520 may include at least one of the Internet, a computer network (e.g., a local area network (LAN) or wide area network (WAN)), or a mobile communication unit. The mobile communication unit may transmit and receive wireless signals to and from at least one of a base station, an external terminal (e.g., the user equipment 300), or the server device 200 over a mobile communication network. The wireless signal may include a voice call signal, a video call signal or different types of data involved in transmission/reception of a text/multimedia message. The mobile communication unit may include at least one of a 3G module, a 4G module, an LTE module, a 5G module, a 6G module, an NB-IoT module, or an LTE-M module, or the like, but the present disclosure is not limited thereto.

The sensor unit 1400 may include at least one of a device detection sensor 1470 and a temperature sensor 1460, but the present disclosure is not limited thereto. The device detection sensor 1470 may be a sensor for detecting the cooking container being put on the upper plate. For example, the device detection sensor 1470 may be implemented with a current sensor, but the present disclosure is not limited thereto. The device detection sensor 1470 may be implemented with at least one of a proximity sensor, a touch sensor, a weight sensor, a temperature sensor, a light sensor or a magnetic sensor.

The temperature sensor 1460 may detect the temperature of the cooking container put on the upper plate or the temperature of the upper plate. The cooking container may be induction-heated by the operating coil, and may be overheated depending on the material. Hence, the electronic device 100 may detect the temperature of the cooking container put on the upper plate or the temperature of the upper plate, and terminate operation of the operating coil when the cooking container is overheated.

The temperature sensor 1460 may include a thermistor whose electric resistance is changed according to the temperature. For example, the temperature sensor 1460 may be a negative temperature coefficient (NTC) temperature sensor, but the present disclosure is not limited thereto. The temperature sensor 1460 may be a positive temperature coefficient (PTC) temperature sensor.

Figure 6:
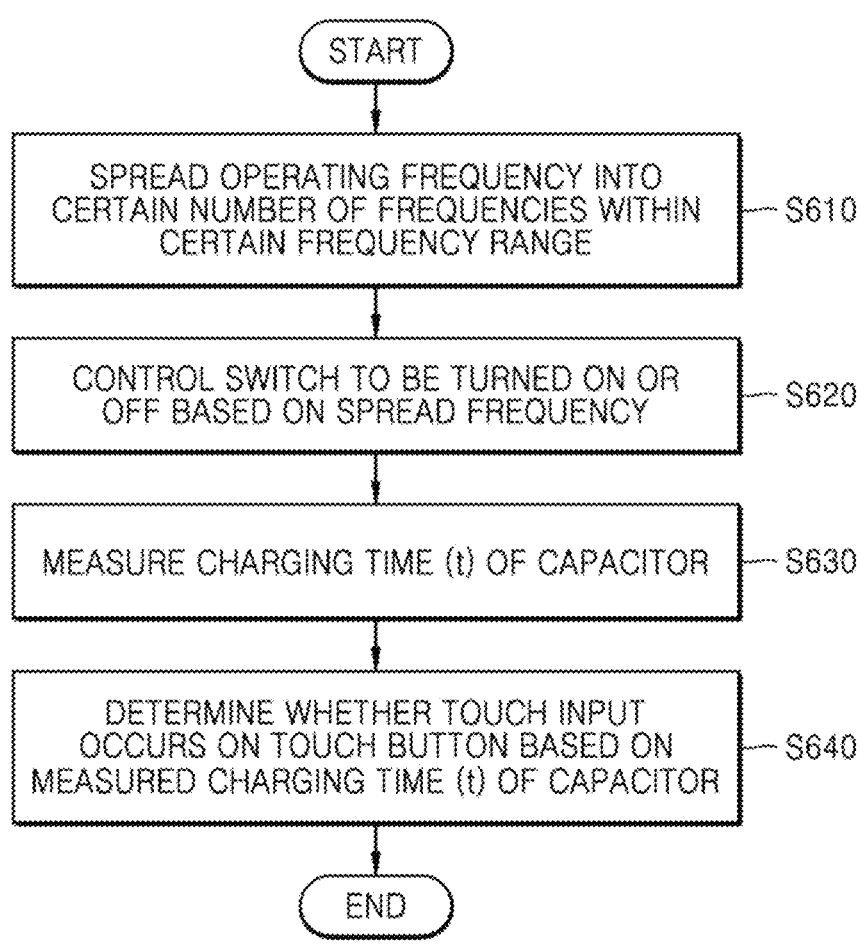
FIG. 6 is a flowchart of a method of operating an electronic device, according to an embodiment of the present disclosure.

FIG. 6 is a flowchart of a method of operating the electronic device 100, according to an embodiment of the present disclosure.

In operation S610, the electronic device 100 may spread an operating frequency into a certain number of frequencies within a certain frequency range. For example, the electronic device 100 may spread the operating frequency (e.g., 150 kHz) into n (e.g., 16) frequencies within a frequency range of (the operating frequency ±X (e.g., 10%) as shown in FIG. 3.

For example, the electronic device 100 may spread a certain number of frequencies within a certain frequency range centered at the operating frequency of the switch 20. For example, the electronic device 100 may spread eight (8) frequencies between 135 kHz and 150 kHz and eight (8) frequencies between 150 kHz and 165 kHz centered at a fixed operating frequency 150 kHz, as shown in FIG. 3. For example, the electronic device 100 may spread the operating frequency into eight (8) frequencies (e.g., 135 kHz, 137 kHz, 139 kHz, 141 kHz, 143 kHz, 145 kHz, 147 kHz and 149 kHz), and another eight (8) frequencies (e.g., 151 kHz, 153 kHz, 155 kHz, 157 kHz, 159 kHz, 161 kHz, 163 kHz and 165 kHz), with gaps of 2 kHz.

In operation S620, the electronic device 100 may control the switch 20 to be turned on and/or off based on the spread frequencies. For example, when the spread frequencies have 16 frequencies within a frequency range of the operating frequency (150 kHz)±10%, the electronic device 100 may control the switch 20 to be turned on and/or off based on the spread 16 frequencies as shown in FIG. 3. In an embodiment of the present disclosure, the controlling of the switch 20 to be turned on and/or off based on the spread frequencies may be described as controlling the switch 20 to be turned on and/or off by using a control signal based on the spread frequencies.

For example, in the case that 16 frequencies include the eight (8) frequencies (e.g., 135 kHz, 137 kHz, 139 kHz, 141 kHz, 143 kHz, 145 kHz, 147 kHz and 149 kHz), and the other eight (8) frequencies (e.g., 151 kHz, 153 kHz, 155 kHz, 157 kHz, 159 kHz, 161 kHz, 163 kHz and 165 kHz), the electronic device 100 may control the switch 20 to be turned on and/or off based on a frequency of 165 kHz. The electronic device 100 may then control the switch 20 to be turned on and/or off based on a frequency of 163 kHz. The electronic device 100 may then control the switch 20 to be turned on and/or off based on a frequency of 161 kHz. The electronic device 100 may then control the switch 20 to be turned on and/or off based on a frequency of 159 kHz. The electronic device 100 may then control the switch 20 to be turned on and/or off based on a frequency of 157 kHz. The electronic device 100 may then control the switch 20 to be turned on and/or off based on a frequency of 155 kHz. The electronic device 100 may then control the switch 20 to be turned on and/or off based on a frequency of 153 kHz. The electronic device 100 may then control the switch 20 to be turned on and/or off based on a frequency of 151 kHz. The electronic device 100 may then control the switch 20 to be turned on and/or off based on a frequency of 149 kHz. The electronic device 100 may then control the switch 20 to be turned on and/or off based on a frequency of 147 kHz. The electronic device 100 may then control the switch 20 to be turned on and/or off based on a frequency of 145 kHz. The electronic device 100 may then control the switch 20 to be turned on and/or off based on a frequency of 143 kHz. The electronic device 100 may then control the switch 20 to be turned on and/or off based on a frequency of 141 kHz. The electronic device 100 may then control the switch 20 to be turned on and/or off based on a frequency of 139 kHz. The electronic device 100 may then control the switch 20 to be turned on and/or off based on a frequency of 137 kHz. The electronic device 100 may then control the switch 20 to be turned on and/or off based on a frequency of 135 kHz.

The changing the spread frequencies is not limited to sequential changes in sequence as described above. For example, the electronic device 100 may use one frequency multiple times to control the switch 20 to be turned on and/or off. For example, the electronic device 100 may use a frequency of 165 kHz multiple times (e.g., three to eight times) to control the switch 20 to be turned on and/or off. The processor 120 may then use from 163 kHz to 135 kHz in sequence multiple times (e.g., three to eight times) to control the switch 20 to be turned on and/or off. Furthermore, the electronic device 100 may perform an operation to control the switch 20 to be turned on and/or off by switching frequencies from 135 kHz to 165 kHz in a reverse sequence to what is described above. The electronic device 100 may perform an operation to control the switch 20 to be turned on and/or off by sequentially switching frequencies from 135 kHz to 165 kHz in a reverse sequence to what is described above.

In operation S630, the electronic device 100 may measure the charging time t of the capacitor C1. The measuring of the charging time t of the capacitor C1 may also be said as obtaining the charging time t of the capacitor C1. The electronic device 100 may measure the charging time t of the capacitor C1 each time to control the switch 20 to be turned on and/or off with the certain number of frequencies (e.g., 135 kHz, 137 kHz, 139 kHz, 141 kHz, 143 kHz, 145 kHz, 147 kHz, 149 kHz, 151 kHz, 153 kHz, 155 kHz, 157 kHz, 159 kHz, 161 kHz, 163 kHz and 165 kHz). In the case that the certain number of frequencies is 16 as described above, the number of charging times t of the capacitor C1 measured by the electronic device 100 may be 16. For example, in the case of controlling the switch 20 to be turned on and/or off by using the certain number (e.g., 16) of frequencies multiple times (e.g., three times), the electronic device 100 may measure 48 (16×3) charging times t of the capacitor C1, in operation S630.

In operation S640, the electronic device 100 may determine whether a touch input occurs on the touch button 10 based on the measured charging time t of the capacitor C1. For example, the electronic device 100 may obtain an average value of the certain number of charging times t of the capacitor C1 measured by controlling the switch to be turned on and/or off based on the certain number of frequencies. For example, when the number of frequencies is 16, the charging time t of the capacitor C1 is measured 16 times, so the electronic device 100 may obtain an average value of the 16 measured charging times t of the capacitor C1.

Figure 7:
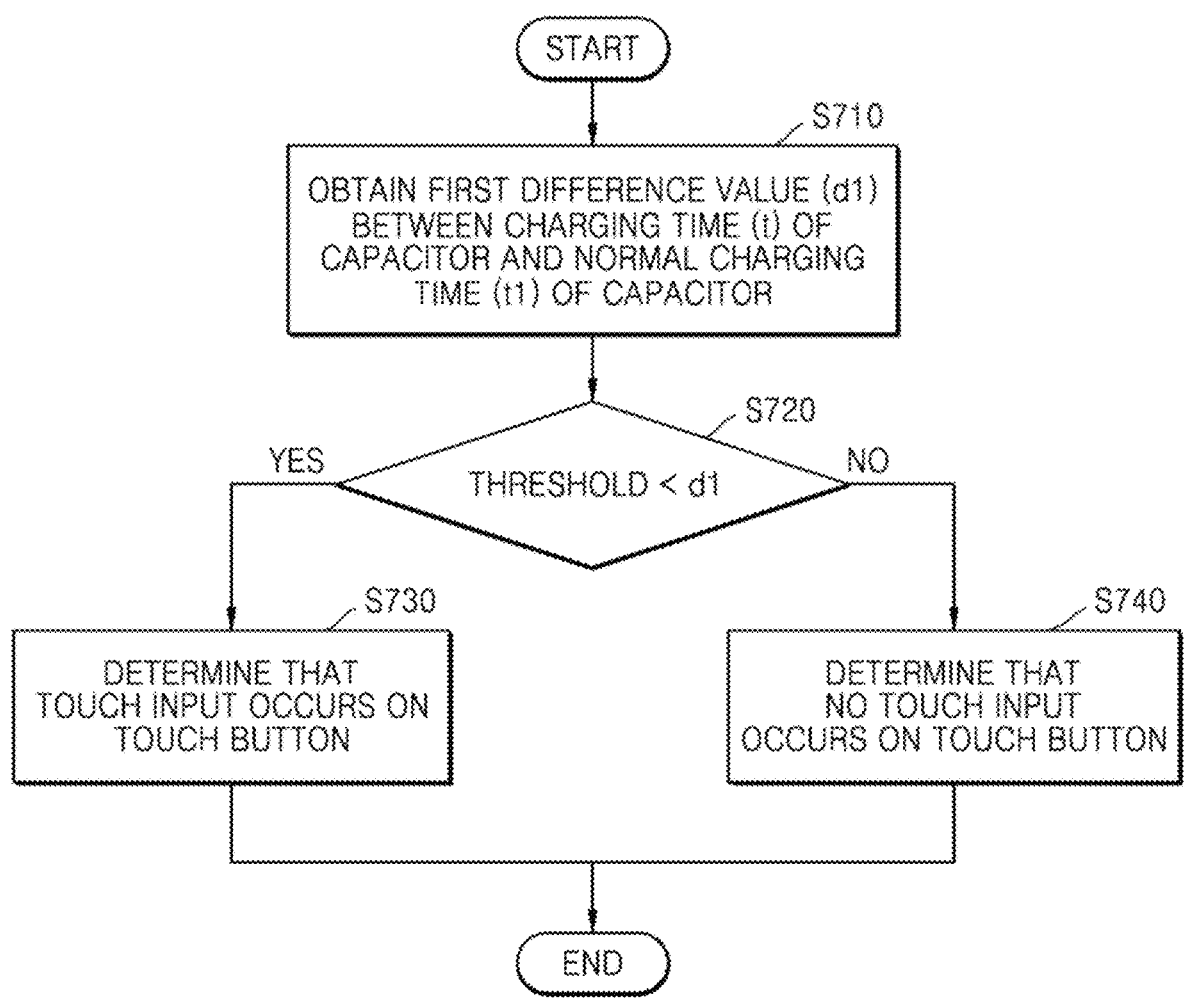
FIG. 7 is a flowchart of a procedure for determining whether a touch input occurs in a method of operating an electronic device, according to an embodiment of the present disclosure.

The electronic device 100 may use the obtained average value of the charging times (t) of the capacitor C1 to determine whether a touch input occurs on the touch button 10 as shown in FIG. 7.

In operation S640, the electronic device 100 may determine whether a touch input occurs on the touch button 10 by using the charging time t of the capacitor C1 measured while controlling the switch 20 to be turned on and/or off for each of the spread frequencies. For example, the electronic device 100 may determine whether a touch input occurs on the touch button 10 by using on the charging time t of the capacitor C1 measured based on a frequency of 165 kHz. The electronic device 100 may use the charging time t of the capacitor C1 measured based on the next frequency (e.g., 163 kHz) to determine whether a touch input occurs on the touch button 10. Although the electronic device 100 may make a final decision about whether a touch input occurs on the touch button 10 based on a result of determining based on the 16 frequencies (e.g., a result of determining whether a touch input occurs), an operation of determining whether a touch input occurs on the touch button 10 based on the charging time t of the capacitor C1 according to an embodiment of the present disclosure is not limited thereto.

FIG. 7 is a flowchart of a procedure for determining whether a touch input occurs on the touch button 10 in a method of operating the electronic device 100, according to an embodiment of the present disclosure.

In operation S710, the electronic device 100 may obtain the first difference value d1 between the measured charging time t of the capacitor C1 and the normal charging time t1 of the capacitor C1 when there is no touch input on the touch button 10 (e.g., d1=t−t1).

In operation S720, the electronic device 100 may compare the obtained first difference value d1 with a threshold. The electronic device 100 may determine that a touch input occurs on the touch button 10, in operation S730, when the obtained first difference value d1 exceeds the threshold (YES in operation S720). The threshold may be the second difference value d2 between the charging time t2 of the capacitor C1 when there is a normal touch input on the touch button 10 and the normal charging time t1 of the capacitor C1 while no touch input occurs on the touch button 10 (e.g., d2=t2−t1).

In operation S720, when the obtained first difference value d1 is less than or equal to the threshold (NO in operation S720), the electronic device 100 may determine that no touch input occurs on the touch button 10 in operation S740.

Figure 8:
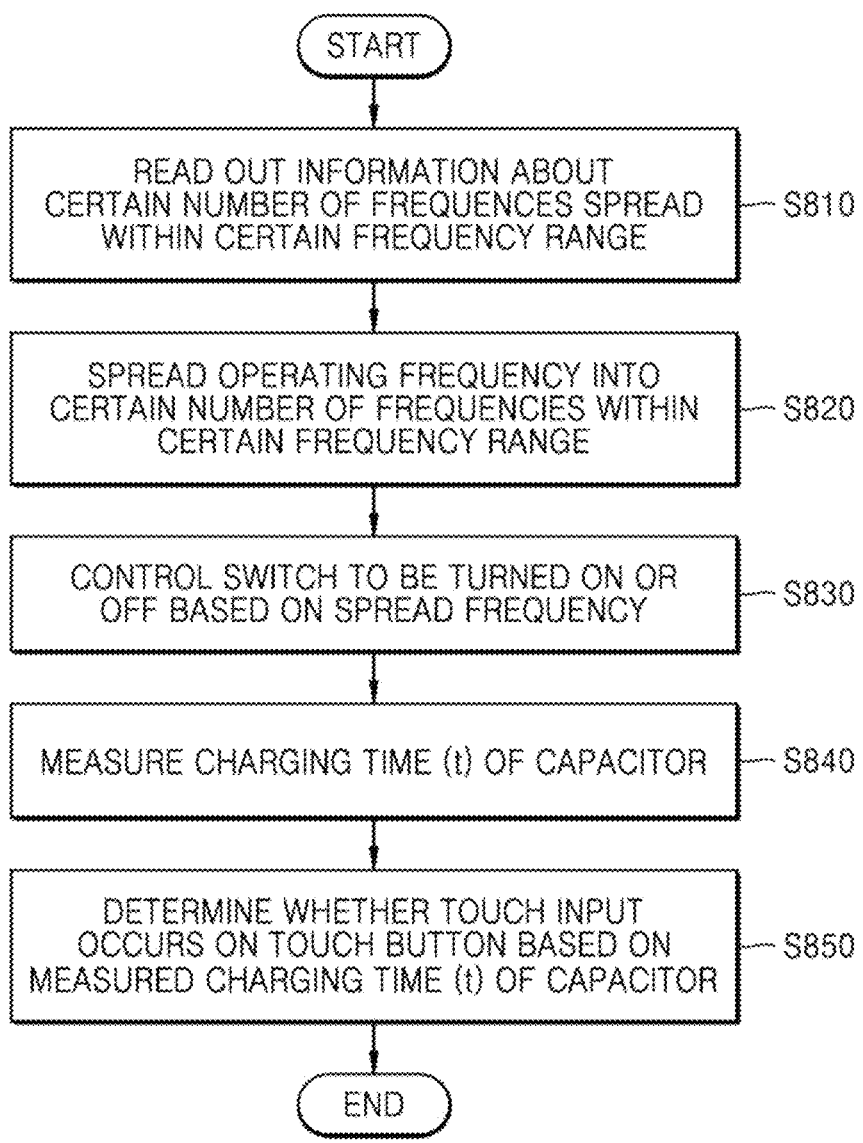
FIG. 8 is a flowchart of a method of operating an electronic device, according to an embodiment of the present disclosure.

FIG. 8 is a flowchart of operation of the electronic device 100, according to an embodiment of the present disclosure. FIG. 8 is an example including an operation of reading information about a certain number of frequencies within a certain frequency range from the memory, in addition to the flowchart of FIG. 6.

In operation S810, the electronic device 100 may read information about a certain number of frequencies within a certain frequency range stored in the memory 130.

In operation S820, the electronic device 100 may spread an operating frequency into a preset number of frequencies within a preset frequency range. For example, the electronic device 100 may spread the operating frequency (e.g., 150 kHz) as shown in FIG. 3 into n (e.g., 16) frequencies within a frequency range of the operating frequency ±X (e.g., 10)%.

For example, the electronic device 100 may spread an operating frequency of the switch 20 into a certain number of frequencies within a certain frequency range centered at the operating frequency. For example, the electronic device 100 may spread eight (8) frequencies between 135 kHz to 150 kHz and eight (8) frequencies between 150 kHz to 165 kHz based on a fixed operating frequency of 150 kHz, as shown in FIG. 3. For example, the electronic device 100 may spread the operating frequency into eight (8) frequencies (e.g., 135 kHz, 137 kHz, 139 kHz, 141 kHz, 143 kHz, 145 kHz, 147 kHz and 149 kHz), and another eight (8) frequencies (e.g., 151 kHz, 153 kHz, 155 kHz, 157 kHz, 159 kHz, 161 kHz, 163 kHz and 165 kHz), with gaps of 2 kHz.

In operation S830, the electronic device 100 may control the switch 20 to be turned on and/or off based on the spread frequencies. For example, when the spread frequencies have 16 frequencies within a frequency range of the operating frequency (150 kHz)±10%, the electronic device 100 may control the switch 20 to be turned on and/or off based on the spread 16 frequencies as shown in FIG. 3.

For example, in the case that 16 frequencies include the eight (8) frequencies (e.g., 135 kHz, 137 kHz, 139 kHz, 141 kHz, 143 kHz, 145 kHz, 147 kHz and 149 kHz), and the other eight (8) frequencies (e.g., 151 kHz, 153 kHz, 155 kHz, 157 kHz, 159 kHz, 161 kHz, 163 kHz and 165 kHz), the electronic device 100 may control the switch 20 to be turned on and/or off based on a frequency of 165 kHz. The electronic device 100 may then control the switch 20 to be turned on and/or off based on a frequency of 163 kHz. The electronic device 100 may then control the switch 20 to be turned on and/or off based on a frequency of 161 kHz. The electronic device 100 may then control the switch 20 to be turned on and/or off based on a frequency of 159 kHz. The electronic device 100 may then control the switch 20 to be turned on and/or off based on a frequency of 157 kHz. The electronic device 100 may then control the switch 20 to be turned on and/or off based on a frequency of 155 kHz. The electronic device 100 may then control the switch 20 to be turned on and/or off based on a frequency of 153 kHz. The electronic device 100 may then control the switch 20 to be turned on and/or off based on a frequency of 151 kHz. The electronic device 100 may then control the switch 20 to be turned on and/or off based on a frequency of 149 kHz. The electronic device 100 may then control the switch 20 to be turned on and/or off based on a frequency of 147 kHz. The electronic device 100 may then control the switch 20 to be turned on and/or off based on a frequency of 145 kHz. The electronic device 100 may then control the switch 20 to be turned on and/or off based on a frequency of 143 kHz. The electronic device 100 may then control the switch 20 to be turned on and/or off based on a frequency of 141 kHz. The electronic device 100 may then control the switch 20 to be turned on and/or off based on a frequency of 139 kHz. The electronic device 100 may then control the switch 20 to be turned on and/or off based on a frequency of 137 kHz. The electronic device 100 may then control the switch 20 to be turned on and/or off based on a frequency of 135 kHz.

The switching between the spread frequencies is not limited to sequential switching as described above. For example, the electronic device 100 may use one frequency multiple times to control the switch 20 to be turned on and/or off. For example, the electronic device 100 may use the frequency of 165 kHz multiple times (e.g., three (3) to eight (8) times) to control the switch 20 to be turned on and/or off. The electronic device 100 may sequentially use the subsequent frequencies from 163 kHz to 135 kHz multiple times to control the switch 20 to be turned on and/or off. Furthermore, the electronic device 100 may control the switch 20 to be turned on and/or off by switching frequencies from 135 kHz to 165 kHz in a reverse sequence to what is described above. The electronic device 100 may control the switch 20 to be turned on and/or off by sequentially switching frequencies from 135 kHz to 165 kHz in a reverse sequence to what is described above.

In operation S840, the electronic device 100 may measure the charging time t of the capacitor C1. The measuring of the charging time t of the capacitor C1 may also be said as obtaining the charging time t1 of the capacitor C1. The electronic device 100 may measure the charging time t of the capacitor C1 each time to control the switch 20 to be turned on and/or off with the certain number of frequencies (e.g., 135 kHz, 137 kHz, 139 kHz, 141 kHz, 143 kHz, 145 kHz, 147 kHz, 149 kHz, 151 kHz, 153 kHz, 155 kHz, 157 kHz, 159 kHz, 161 kHz, 163 kHz and 165 kHz). In the case that the certain number of frequencies is 16 as described above, the number of charging times t of the capacitor C1 measured by the electronic device 100 may be 16. For example, in the case of controlling the switch 20 to be turned on and/or off by using the certain number (e.g., 16) of frequencies multiple times (e.g., three (3) times), the electronic device 100 may measure 48 (16×3) charging times t of the capacitor C1, in operation S630.

In operation S840, the electronic device 100 may determine whether a touch input occurs on the touch button 10 based on the measured charging time t of the capacitor C1. For example, the electronic device 100 may obtain an average value of the certain number of charging times t of the capacitor C1 measured by controlling the switch to be turned on and/or off by using the certain number of frequencies. For example, when the number of frequencies is 16, the charging time t of the capacitor C1 is measured 16 times, so the electronic device 100 may obtain an average value of the 16 measured charging times t of the capacitor C1.

The electronic device 100 may use the obtained average value of the charging times (t) of the capacitor C1 to determine whether a touch input occurs on the touch button 10 as shown in FIG. 7.

In operation S840, the electronic device 100 may determine whether a touch input occurs on the touch button 10 by using the charging time t of the capacitor C1 measured by controlling the switch 20 to be turned on and/or off for each of the spread frequencies. For example, the electronic device 100 may determine whether a touch input occurs on the touch button 10 by using the charging time t of the capacitor C1 measured based on a frequency of 165 kHz. The electronic device 100 may use the charging time t of the capacitor C1 measured based on the next frequency (e.g., 163 kHz) to determine whether a touch input occurs on the touch button 10. Although the electronic device 100 may make a final decision on whether a touch input occurs on the touch button 10 based on a result of determining based on the 16 frequencies (a result of determining whether a touch input occurs), an operation of determining whether a touch input occurs on the touch button 10 based on the charging time t of the capacitor C1 according to an embodiment of the present disclosure is not limited thereto.

FIGS. 6 to 8 as described above may be performed by the processor 120 of the electronic device 100.

FIG. 9 is a diagram of operations associated with the electronic device 100, the server device 200 and the user equipment 300, according to an embodiment of the present disclosure.

Referring to FIG. 9, the electronic device 100 according to an embodiment of the present disclosure may communicate with the server device 200 and the user equipment 300. In an embodiment of the present disclosure, the electronic device 100 may transmit identity information of the electronic device 100 or identity information of the user (e.g., login information or account information) to the server device 200. The server device 200 may authenticate the electronic device 100 based on the received identity information of the electronic device 100 or the identity information of the user (e.g., login information or account information), transmit the authentication result to the electronic device 100, and then allow the server device 200 to access the electronic device 100.

The electronic device 100 may request the server device 200 to update software related to the electronic device 100 as the access from the server device 200 is allowed. The software related to the electronic device 100 may include software for determining whether a touch input occurs on the touch button 10. The information about a certain frequency range and the certain number of frequencies for controlling the switch 20 to be turned on and/or off included in the software for determining whether a touch input occurs on the touch button 10 may be the same as or different from information about the certain frequency range and the certain number of frequencies for controlling the switch 20 to be turned on and/or off included in the software stored in the electronic device 100.

The server device 200 may include a communication interface for communicating with an external device. The server device 200 may communicate with the electronic device 100 or the user equipment 300 through the communication interface. The server device 200 may update the software of the electronic device 100 based on the communicating with the electronic device 100 or transmit updated software related to the electronic device 100 based on the communicating with the user equipment 300.

In an embodiment of the present disclosure, the server device 200 may include an AI processor. The AI processor may input information into an AI model for the touch button 10 of the electronic device 100 for training. This information may include an amount of noise likely to be introduced to the electronic device 100, the charging time t of the capacitor C1 measured according to the turning on or off of the switch 20 based on the certain number of frequencies within the certain operating frequency range, and speed of operation for determining whether a touch input occurs on the touch button 10 of the processor 120. The training of the AI model may refer to building a mathematical model that is able to make a best decision while changing weights properly based on the input data.

In an embodiment of the present disclosure, the user equipment 300 may be connected to the server device 200 and may wirelessly (or remotely) control an operation of the electronic device 100 or update the software of the electronic device 100 based on a program provided from the server device 200. For example, the user equipment 300 may transmit or receive information to or from the server device 200 through a certain application (a management application for the electronic device 100) installed in the user equipment 300.

In an embodiment of the present disclosure, the user equipment 300 may be connected to the server device 200 by using the identity information of the user (e.g., the login information or account information) that is equal to the electronic device 100. The user equipment 300 may be directly connected to the electronic device 100 through a short-range wireless communication channel or indirectly connected to the electronic device 100 through the server device 200.

According to an embodiment of the present disclosure, the user equipment 300 may be implemented in various forms. For example, the user equipment 300 as described herein may be a mobile terminal, a vehicle, a refrigerator with a display, a television (TV), a computer, or the like, but the present disclosure is not limited thereto. The mobile terminal may include a smart phone, a laptop computer, a tablet personal computer (tablet PC), a digital camera, an electronic book (e-book) reader, a digital broadcasting terminal, a personal digital assistant (PDA), a portable multimedia player (PMP), a navigation system, an MP3 player, or the like, but the present disclosure is not limited thereto. For example, the mobile terminal may be a wearable device that may be worn by the user.

In an embodiment of the present disclosure, the user equipment 300 or the electronic device 100 may receive an analog voice signal through a microphone, and convert a voice part into computer-readable text by using an automatic speech recognition (ASR) model. The user equipment 300 or the electronic device 100 may obtain the user's intention of talking by interpreting the converted text by using a natural language understanding (NLU) model. The ASR model or the NLU model may be an AI model. The AI model may be processed by an AI dedicated processor designed in a hardware structure specialized in processing the AI model. The AI model may be made by learning. The learning may be performed in a device itself where the AI according to the present disclosure is performed (e.g., the user equipment 300 or the electronic device 100) or performed through a separate server device 200 and/or a system. Examples of the learning algorithm may include supervised learning, unsupervised learning, semi-supervised learning, or reinforcement learning, but the present disclosure is not limited thereto.

In an embodiment of the present disclosure, the user equipment 300 may run a certain application (e.g., a management application for the electronic device 100) provided by the server device 200, based on a user input. In this case, the user may control an operation of the electronic device 100 through the application's running screen and check a monitoring image or a cooking process image in the inside space (e.g., a cooking chamber) of the electronic device 100.

According to an embodiment of the present disclosure, provided is the electronic device 100 including the user interface 110 and the at least one processor 120, wherein the user interface 110 may include the at least one touch button 10, the capacitor C1 connected to the at least one touch button 10, and the switch 20 connected between the at least one touch button 10 and the capacitor C1 and used to charge and/or discharge the capacitor C1, and the at least one processor 120 may spread an operating frequency into a certain number of frequencies within a certain frequency range, control the switch 20 to be turned on and/or off based on the spread frequencies, measure the charging time t of the capacitor C1 according to the turning on or off of the switch 20, and determine whether a touch input occurs on the touch button 10 based on the measured charging time t. Accordingly, the electronic device 100 may prevent wrong decision of a touch input due to noise.

According to an embodiment of the present disclosure, the electronic device 100 includes the user interface 110 for receiving a user input through the at least one touch button 10, and at least one processor 120, wherein the at least one processor 120 may spread an operating frequency into a certain number of frequencies within a certain frequency range, control the switch 20 to be turned on and/or off to charge and/or discharge the capacitor C1 connected to the at least one touch button 10 based on the spread frequencies, measure the charging time t of the capacitor C1 according to the turning on or off of the switch 20, and determine whether a touch input occurs on the touch button 10 based on the measured charging time t.

According to an embodiment of the present disclosure, the at least one processor 120 may obtain the first difference value d1 between the measured charging time t of the capacitor C1 and the normal charging time t1 of the capacitor C1 when there is no touch input on the touch button 10, determine that a touch input occurs on the touch button 10 when the obtained first difference value d1 exceeds a threshold, and determine that no touch input occurs on the touch button 10 when the obtained first difference value d1 is less than or equal to the threshold.

According to an embodiment of the present disclosure, the threshold may be the second difference value d2 between the charging time t2 of the capacitor C1 when there is a normal touch input on the touch button 10 and the normal charging time t1 of the capacitor C1 while no touch input occurs on the touch button 10.

According to an embodiment of the present disclosure, the measured charging time t of the capacitor C1 may be an average value of a certain number of charging times of the capacitor C1, which are obtained according to turning on or off of the switch 20 based on a certain number of frequencies.

According to an embodiment of the present disclosure, the at least one processor 120 may control the switch 20 to be turned on and/or off by switching between the spread frequencies.

According to an embodiment of the present disclosure, the at least one processor 120 may control the switch 20 to be turned on and/or off by sequentially switching the spread frequencies.

According to an embodiment of the present disclosure, the at least one processor 120 may use the same frequency multiple times to control the switch 20 to be turned on and/or off based on the spread frequencies.

According to an embodiment of the present disclosure, the electronic device 100 may include the memory 130 for storing information about a certain number of spread frequencies within a certain frequency range, and the at least one processor 120 may be configured to read out the information about the certain number of spread frequencies within the certain frequency range stored in the memory 130 to spread an operating frequency.

According to an embodiment of the present disclosure, the certain number of spread frequencies within the certain frequency range may be based on specifications of the electronic device 100.

According to an embodiment of the present disclosure, the certain number of spread frequencies within the certain frequency range may be based on at least one of an amount of noise likely to be introduced to the electronic device 100 and a speed of operation of the at least one processor 120 determining whether a touch input occurs on the touch button 10.

According to an embodiment of the present disclosure, a method of operating the electronic device 100 including the user interface 110 including the at least one touch button 10, the capacitor C1 connected to the at least one touch button 10, and the switch 20 connected between the at least one touch button 10 and the capacitor C1 and used to charge and/or discharge the capacitor C1, and the at least one processor 120 may include spreading an operating frequency into a certain number of frequencies within a certain frequency range, controlling the switch 20 to be turned on and/or off to charge and/or discharge the capacitor C1 based on the spread frequencies, measuring the charging time t of the capacitor C1 according to the turning on or off of the switch 20, and determining whether a touch input occurs on the touch button 10 based on the measured charging time t.

According to an embodiment of the present disclosure, the determining of whether a touch input occurs on the touch button 10 may include obtaining the first difference value d1 between the measured charging time t of the capacitor C1 and the normal charging time t1 of the capacitor C1 when no touch input occurs on the touch button 10, determining that a touch input occurs on the touch button 10 when the obtained first difference value d1 exceeds a threshold, and determining that no touch input occurs on the touch button 10 when the obtained first difference value d1 is less than or equal to the threshold.

According to an embodiment of the present disclosure, the controlling of the switch 20 to be turned on and/or off may be performed by switching between the spread frequencies.

According to an embodiment of the present disclosure, the controlling of the switch 20 to be turned on and/or off may be performed by sequentially switching the spread frequencies.

According to an embodiment of the present disclosure, the controlling of the switch 20 to be turned on and/or off based on the spread frequencies may include controlling the switch 20 to be turned on and/or off by using the same frequency multiple times.

According to an embodiment of the present disclosure, the method may include reading information about a certain number of frequencies spread within a certain frequency range from the memory 130 included in the electronic device 100.

The machine-readable storage medium may be provided in the form of a non-transitory storage medium. The term 'non-transitory storage medium' may mean a tangible device without including a signal (e.g., electromagnetic waves) and may not distinguish between storing data in the storage medium semi-permanently and temporarily. For example, the non-transitory storage medium may include a buffer that temporarily stores data.

In an embodiment of the present disclosure, the aforementioned method according to the various embodiments of the present disclosure may be provided in a computer program product. The computer program product may be a commercial product that may be traded between a seller and a buyer. The computer program product may be distributed in the form of a machine-readable storage medium (e.g., a CD-ROM) or distributed directly between two user devices (e.g., smart phones) or online (e.g., downloaded or uploaded). In the case of the online distribution, at least part of the computer program product (e.g., a downloadable app) may be at least temporarily stored or arbitrarily created in a storage medium that may be readable to a device such as a server of the manufacturer, a server of the application store, or a relay server.

What is claimed is:

1. An electronic device, comprising:
   one or more processors comprising processing circuitry;
   a memory storing instructions; and
   a user interface comprising:
     at least one touch button;
     a capacitor coupled with the at least one touch button; and
     a switch, coupled between the at least one touch button and the capacitor, configured to charge the capacitor, and to discharge the capacitor,
   wherein the instructions, when executed by the one or more processors individually or collectively, cause the electronic device to:
     spread an operating frequency into a plurality of spread frequencies within a frequency range;
     determine, based on the plurality of spread frequencies, whether to at least one of charge the capacitor or discharge the capacitor by controlling the switch to at least one of turn on or turn off;
     measure a charging time of the capacitor, according to the controlling of the switch; and
     determine whether a touch input on the at least one touch button occurs, based on the measured charging time.

2. The electronic device of claim 1, wherein the instructions, when executed by the one or more processors individually or collectively, further cause the electronic device to:
   obtain a first difference value between the measured charging time of the capacitor and a first charging time of the capacitor based on no touch input occurring on the at least one touch button;
   determine, based on the first difference value exceeding a threshold value, that the touch input on the at least one touch button has occurred; and
   determine, based on the first difference value being less than or equal to the threshold value, that the touch input on the at least one touch button has not occurred, and
   wherein the threshold value is a second difference value between a second charging time of the capacitor based on the touch input occurring on the at least one touch button and the first charging time of the capacitor.

3. The electronic device of claim 1, wherein the instructions, when executed by the one or more processors individually or collectively, further cause the electronic device to:
   measure the measured charging time of the capacitor obtaining a plurality of charging times of the capacitor according to the controlling of the switch based on the plurality of spread frequencies, and determining an average value of the plurality of charging times of the capacitor as the measured charging time of the capacitor.

4. The electronic device of claim 1, wherein the instructions, when executed by the one or more processors individually or collectively, further cause the electronic device to:
   control the switch to be turned on or turned off by switching between the plurality of spread frequencies.

5. The electronic device of claim 1, wherein the instructions, when executed by the one or more processors individually or collectively, further cause the electronic device to:
   control the switch to be turned on or turned off by sequentially switching the plurality of spread frequencies.

6. The electronic device of claim 1, wherein the instructions, when executed by the one or more processors individually or collectively, further cause the electronic device to:
control the switch to be turned on or turned off by switching multiple times a same frequency of the plurality of spread frequencies.

7. The electronic device of claim 1, wherein the memory stores information about the plurality of spread frequencies spread within the frequency range, and
wherein the instructions, when executed by the one or more processors individually or collectively, further cause the electronic device to:
read, from the memory, the information about the plurality of spread frequencies spread within the frequency range; and
spread the operating frequency into the plurality of spread frequencies within the frequency range, based on the information about the plurality of spread frequencies spread within the frequency range.

8. The electronic device of claim 1, wherein the instructions, when executed by the one or more processors individually or collectively, further cause the electronic device to:
determine the plurality of spread frequencies spread within the frequency range based on at least one of an amount of noise to be introduced to the electronic device or a speed of operation of the one or more processors determining whether the touch input has occurred on the at least one touch button.

9. A method of operating an electronic device, the method comprising:
spreading an operating frequency into a plurality of spread frequencies within a frequency range;
determining, based on the plurality of spread frequencies, whether to at least one of charge a capacitor of the electronic device or discharge the capacitor by controlling a switch of the electronic device to at least one of turn on or turn off;
measuring a charging time of the capacitor according to the controlling of the switch; and
determining whether a touch input on a touch button of the electronic device has occurred, based on the measured charging time.

10. The method of claim 9, wherein the determining of whether the touch input on the touch button occurs comprises:
obtaining a first difference value between the measured charging time of the capacitor and a first charging time of the capacitor based on no touch input occurring on the touch button;
determining, based on the first difference value exceeding a threshold value, that the touch input on the touch button has occurred; and
determining, based on the first difference value being less than or equal to the threshold value, that the touch input to the touch button has not occurred,
wherein the threshold value is a second difference value between a second charging time of the capacitor based on the touch input occurring on the touch button and the first charging time of the capacitor, and
wherein the measured charging time of the capacitor is an average value of a plurality of charging times of the capacitor, which are measured according to the controlling of the switch based on the plurality of spread frequencies.

11. The method of claim 9, wherein the controlling of the switch comprises:
controlling the switch to be turned on or turned off by switching between the plurality of spread frequencies.

12. The method of claim 9, wherein the controlling of the switch comprises:
controlling the switch to be turned on or turned off by sequentially switching the plurality of spread frequencies.

13. The method of claim 9, wherein the controlling of the switch comprises:
controlling the switch to be turned on or off by using multiple times a same frequency of the plurality of spread frequencies.

14. The method of claim 9, further comprising:
reading out, from a memory of the electronic device, information about the plurality of spread frequencies spread within the frequency range; and
spreading the operating frequency into the plurality of spread frequencies within the frequency range, based on the information about the plurality of spread frequencies spread within the frequency range.

15. The method of claim 9, further comprising:
determining the plurality of spread frequencies spread within the frequency range based on at least one of an amount of noise to be introduced to the electronic device or a speed of operation of at least one processor of the electronic device determining whether the touch input has occurred on the touch button.

* * * * *